United States Patent
Zha et al.

(10) Patent No.: US 8,372,276 B2
(45) Date of Patent: Feb. 12, 2013

(54) MEMBRANE CLEANING WITH PULSED AIRLIFT PUMP

(75) Inventors: Fufang Zha, West Ryde (AU); Gerin James, Hazelbrook (AU); Joseph Edward Zuback, Camarillo, CA (US); Peter Zauner, Faulconbridge (AU); Roger William Phelps, Kings Langley (AU)

(73) Assignee: Siemens Industry, Inc., Alpharetta, GA (US)

(*) Notice: Subject to any disclaimer, the term of this patent is extended or adjusted under 35 U.S.C. 154(b) by 0 days.

(21) Appl. No.: 13/298,575

(22) Filed: Nov. 17, 2011

(65) Prior Publication Data

US 2012/0061333 A1    Mar. 15, 2012

Related U.S. Application Data

(63) Continuation of application No. 12/895,156, filed on Sep. 30, 2010, now Pat. No. 8,287,743, which is a continuation of application No. 12/602,316, filed as application No. PCT/US2008/006799 on May 29, 2008.

(60) Provisional application No. 60/940,507, filed on May 29, 2007.

(51) Int. Cl.
*C02F 3/00* (2006.01)

(52) U.S. Cl. .................................. 210/150; 210/151

(58) Field of Classification Search ........... 210/150–151
See application file for complete search history.

(56) References Cited

U.S. PATENT DOCUMENTS

| | | | |
|---|---|---|---|
| 256,008 | A | 4/1882 | Leak |
| 285,321 | A | 9/1883 | Tams |
| 511,995 | A | 1/1894 | Buckley |
| 1,997,074 | A | 4/1935 | Novotny |
| 2,080,783 | A | 5/1937 | Petersen |
| 2,105,700 | A | 1/1938 | Ramage |
| 2,843,038 | A | 7/1958 | Manspeaker |
| 2,926,086 | A | 2/1960 | Chenicek et al. |
| 3,068,655 | A | 12/1962 | Murray et al. |
| 3,139,401 | A | 6/1964 | Hach |
| 3,183,191 | A | 5/1965 | Hach |
| 3,191,674 | A | 6/1965 | Richardson |
| 3,198,636 | A | 8/1965 | Bouthilet |
| 3,228,876 | A | 1/1966 | Mahon |
| 3,275,554 | A | 9/1966 | Wagenaar |
| 3,442,002 | A | 5/1969 | Geary et al. |
| 3,462,362 | A | 8/1969 | Kollsman |
| 3,472,168 | A | 10/1969 | Inoue et al. |
| 3,472,765 | A | 10/1969 | Budd et al. |
| 3,492,698 | A | 2/1970 | Geary et al. |

(Continued)

FOREIGN PATENT DOCUMENTS

| | | |
|---|---|---|
| AU | 34400/84 A | 4/1985 |
| AU | 55847/86 A | 9/1986 |

(Continued)

OTHER PUBLICATIONS

"Chemical Cleaning Definition", Lenntech BV, Lenntech Water treatment & purification Holding B.V., Chemical Cleaning.

(Continued)

*Primary Examiner* — Chester Barry

(57) ABSTRACT

A method of cleaning a membrane surface immersed in a liquid medium with a fluid flow, including the steps of providing a randomly generated intermittent or pulsed fluid flow along the membrane surface to dislodge fouling materials therefrom. A membrane module is also disclosed comprising a plurality of porous membranes (6) or a set of membrane modules (5) and a device (11) for providing a generally randomly generated, pulsed fluid flow such that, in use, said fluid flow moves past the surfaces of said membranes (6) to dislodge fouling materials therefrom.

10 Claims, 12 Drawing Sheets

U.S. PATENT DOCUMENTS

| | | |
|---|---|---|
| 3,501,798 A | 3/1970 | Carraro |
| 3,505,215 A | 4/1970 | Bray |
| 3,556,305 A | 1/1971 | Shorr |
| 3,591,010 A | 7/1971 | Pall et al. |
| 3,625,827 A | 12/1971 | Wildi et al. |
| 3,654,147 A | 4/1972 | Levin |
| 3,679,052 A | 7/1972 | Asper |
| 3,693,406 A | 9/1972 | Tobin, III |
| 3,700,561 A | 10/1972 | Ziffer |
| 3,700,591 A | 10/1972 | Higley |
| 3,708,071 A | 1/1973 | Crowley |
| 3,728,256 A | 4/1973 | Cooper |
| 3,763,055 A | 10/1973 | White et al. |
| 3,791,631 A | 2/1974 | Meyer |
| 3,795,609 A | 3/1974 | Hill et al. |
| 3,804,258 A | 4/1974 | Okuniewski et al. |
| 3,843,809 A | 10/1974 | Luck |
| 3,876,738 A | 4/1975 | Marinaccio et al. |
| 3,955,998 A | 5/1976 | Clampitt et al. |
| 3,968,192 A | 7/1976 | Hoffman, III et al. |
| 3,992,301 A | 11/1976 | Shippey et al. |
| 3,993,816 A | 11/1976 | Baudet et al. |
| 4,049,765 A | 9/1977 | Yamazaki |
| 4,076,656 A | 2/1978 | White et al. |
| 4,082,683 A | 4/1978 | Galesloot |
| 4,105,556 A | 8/1978 | O'Amaddio et al. |
| 4,105,731 A | 8/1978 | Yamazaki |
| 4,107,043 A | 8/1978 | McKinney |
| 4,138,460 A | 2/1979 | Tigner |
| 4,157,899 A | 6/1979 | Wheaton |
| 4,183,890 A | 1/1980 | Bollinger |
| 4,188,817 A | 2/1980 | Steigelmann |
| 4,190,411 A | 2/1980 | Fujimoto |
| 4,190,419 A | 2/1980 | Bauer |
| 4,192,750 A | 3/1980 | Elfes et al. |
| 4,193,780 A | 3/1980 | Cotton, Jr. et al. |
| 4,203,848 A | 5/1980 | Grandine, II |
| 4,204,961 A | 5/1980 | Cusato, Jr. |
| 4,218,324 A | 8/1980 | Hartmann et al. |
| 4,226,921 A | 10/1980 | Tsang |
| 4,227,295 A | 10/1980 | Bodnar et al. |
| 4,230,583 A | 10/1980 | Chiolle et al. |
| 4,243,525 A | 1/1981 | Greenberg |
| 4,247,498 A | 1/1981 | Castro |
| 4,248,648 A | 2/1981 | Kopp |
| 4,253,936 A | 3/1981 | Leysen et al. |
| 4,271,026 A | 6/1981 | Chen et al. |
| 4,302,336 A | 11/1981 | Kawaguchi et al. |
| 4,315,819 A | 2/1982 | King et al. |
| 4,323,453 A | 4/1982 | Zampini |
| 4,340,479 A | 7/1982 | Pall |
| 4,350,592 A | 9/1982 | Kronsbein |
| 4,353,802 A | 10/1982 | Hara et al. |
| 4,359,359 A | 11/1982 | Gerlach et al. |
| 4,367,139 A | 1/1983 | Graham |
| 4,367,140 A | 1/1983 | Wilson |
| 4,369,605 A | 1/1983 | Opersteny et al. |
| 4,384,474 A | 5/1983 | Kowalski |
| 4,385,150 A | 5/1983 | Miyake et al. |
| 4,388,189 A | 6/1983 | Kawaguchi et al. |
| 4,389,363 A | 6/1983 | Molthop |
| 4,405,688 A | 9/1983 | Lowery et al. |
| 4,407,975 A | 10/1983 | Yamaguchi |
| 4,414,113 A | 11/1983 | LaTerra |
| 4,414,172 A | 11/1983 | Leason |
| 4,415,452 A | 11/1983 | Heil et al. |
| 4,431,545 A | 2/1984 | Pall et al. |
| 4,451,369 A | 5/1984 | Sekino et al. |
| 4,462,855 A | 7/1984 | Yankowsky et al. |
| 4,467,001 A | 8/1984 | Coplan et al. |
| 4,476,015 A | 10/1984 | Schmitt et al. |
| 4,476,112 A | 10/1984 | Aversano |
| 4,491,522 A | 1/1985 | Ishida et al. |
| 4,496,470 A | 1/1985 | Kapiloff et al. |
| 4,511,471 A | 4/1985 | Muller |
| 4,519,909 A | 5/1985 | Castro |
| 4,539,940 A | 9/1985 | Young |
| 4,540,490 A | 9/1985 | Shibata et al. |
| 4,547,289 A | 10/1985 | Okano et al. |
| 4,609,465 A | 9/1986 | Miller |
| 4,610,789 A | 9/1986 | Barch |
| 4,614,109 A | 9/1986 | Hofmann |
| 4,623,460 A | 11/1986 | Kuzumoto et al. |
| 4,623,670 A | 11/1986 | Mutoh et al. |
| 4,629,563 A | 12/1986 | Wrasidlo |
| 4,632,745 A | 12/1986 | Giuffrida et al. |
| 4,636,296 A | 1/1987 | Kunz |
| 4,642,182 A | 2/1987 | Drori |
| 4,647,377 A | 3/1987 | Miura |
| 4,650,586 A | 3/1987 | Ellis, III |
| 4,650,596 A | 3/1987 | Schlueter et al. |
| 4,656,865 A | 4/1987 | Callan |
| 4,660,411 A | 4/1987 | Reid |
| 4,666,543 A | 5/1987 | Kawano |
| 4,670,145 A | 6/1987 | Edwards |
| 4,673,507 A | 6/1987 | Brown |
| 4,687,561 A | 8/1987 | Kunz |
| 4,687,578 A | 8/1987 | Stookey |
| 4,688,511 A | 8/1987 | Gerlach et al. |
| 4,689,191 A | 8/1987 | Beck et al. |
| 4,702,836 A | 10/1987 | Mutoh et al. |
| 4,702,840 A | 10/1987 | Degen et al. |
| 4,707,266 A | 11/1987 | Degen et al. |
| 4,708,799 A | 11/1987 | Gerlach et al. |
| 4,718,270 A | 1/1988 | Storr |
| 4,744,240 A | 5/1988 | Reichelt |
| 4,749,487 A | 6/1988 | Lefebvre |
| 4,756,875 A | 7/1988 | Tajima et al. |
| 4,763,612 A | 8/1988 | Iwanami |
| 4,767,539 A | 8/1988 | Ford |
| 4,774,132 A | 9/1988 | Joffee et al. |
| 4,775,471 A | 10/1988 | Nagai et al. |
| 4,779,448 A | 10/1988 | Gogins |
| 4,781,831 A | 11/1988 | Goldsmith |
| 4,784,771 A | 11/1988 | Wathen et al. |
| 4,793,932 A | 12/1988 | Ford et al. |
| 4,797,187 A | 1/1989 | Davis et al. |
| 4,797,211 A | 1/1989 | Ehrfeld et al. |
| 4,800,019 A | 1/1989 | Bikson et al. |
| 4,810,384 A | 3/1989 | Fabre |
| 4,812,235 A | 3/1989 | Seleman et al. |
| 4,816,160 A | 3/1989 | Ford et al. |
| 4,824,563 A | 4/1989 | Iwahori et al. |
| 4,834,998 A | 5/1989 | Shrikhande |
| 4,839,048 A | 6/1989 | Reed et al. |
| 4,840,227 A | 6/1989 | Schmidt |
| 4,846,970 A | 7/1989 | Bertelsen et al. |
| 4,867,883 A | 9/1989 | Daigger et al. |
| 4,876,006 A | 10/1989 | Ohkubo et al. |
| 4,876,012 A | 10/1989 | Kopp et al. |
| 4,886,601 A | 12/1989 | Iwatsuka et al. |
| 4,888,115 A | 12/1989 | Marinaccio et al. |
| 4,904,426 A | 2/1990 | Lundgard et al. |
| 4,919,815 A | 4/1990 | Copa et al. |
| 4,921,610 A | 5/1990 | Ford et al. |
| 4,931,186 A | 6/1990 | Ford et al. |
| 4,933,084 A | 6/1990 | Bandel et al. |
| 4,935,143 A | 6/1990 | Kopp et al. |
| 4,952,317 A | 8/1990 | Culkin |
| 4,963,304 A | 10/1990 | Im et al. |
| 4,966,699 A | 10/1990 | Sasaki et al. |
| 4,968,430 A | 11/1990 | Hildenbrand et al. |
| 4,968,733 A | 11/1990 | Muller et al. |
| 4,969,997 A | 11/1990 | Kluver et al. |
| 4,988,444 A | 1/1991 | Applegate et al. |
| 4,999,038 A | 3/1991 | Lundberg |
| 5,002,666 A | 3/1991 | Matsumoto et al. |
| 5,005,430 A | 4/1991 | Kibler et al. |
| 5,015,275 A | 5/1991 | Beck et al. |
| 5,024,762 A | 6/1991 | Ford et al. |
| 5,034,125 A | 7/1991 | Karbachsch et al. |
| 5,043,113 A | 8/1991 | Kafchinski et al. |
| 5,059,317 A | 10/1991 | Marius et al. |
| 5,066,375 A | 11/1991 | Parsi et al. |
| 5,066,401 A | 11/1991 | Muller et al. |
| 5,066,402 A | 11/1991 | Anselme et al. |
| 5,069,065 A | 12/1991 | Sprunt et al. |

| | | | | | |
|---|---|---|---|---|---|
| 5,069,353 A | 12/1991 | Espenan | 5,554,283 A | 9/1996 | Brinda et al. |
| 5,075,065 A | 12/1991 | Effenberger et al. | 5,556,591 A | 9/1996 | Jallerat et al. |
| 5,076,925 A | 12/1991 | Roesink et al. | 5,575,963 A | 11/1996 | Soffer et al. |
| 5,079,272 A | 1/1992 | Allegrezza, Jr. et al. | 5,597,732 A | 1/1997 | Bryan-Brown |
| 5,094,750 A | 3/1992 | Kopp et al. | 5,607,593 A | 3/1997 | Cote et al. |
| 5,094,867 A | 3/1992 | Detering et al. | 5,626,755 A | 5/1997 | Keyser et al. |
| 5,098,567 A | 3/1992 | Nishiguchi | 5,629,084 A | 5/1997 | Moya |
| 5,104,535 A | 4/1992 | Cote et al. | 5,633,163 A | 5/1997 | Cameron |
| 5,104,546 A | 4/1992 | Filson et al. | 5,639,373 A | 6/1997 | Mahendran et al. |
| H1045 H | 5/1992 | Wilson | 5,643,455 A | 7/1997 | Kopp et al. |
| 5,135,663 A | 8/1992 | Newberth, III et al. | 5,647,988 A | 7/1997 | Kawanishi et al. |
| 5,137,631 A | 8/1992 | Eckman et al. | 5,670,053 A | 9/1997 | Collentro et al. |
| 5,138,870 A | 8/1992 | Lyssy | 5,677,360 A | 10/1997 | Yamamori et al. |
| 5,147,553 A | 9/1992 | Waite | 5,688,460 A | 11/1997 | Ruschke |
| 5,151,191 A | 9/1992 | Sunaoka et al. | 5,690,830 A | 11/1997 | Ohtani et al. |
| 5,151,193 A | 9/1992 | Grobe et al. | 5,733,456 A | 3/1998 | Okey et al. |
| 5,158,721 A | 10/1992 | Allegrezza, Jr. et al. | 5,744,037 A | 4/1998 | Fujimura et al. |
| 5,169,528 A | 12/1992 | Karbachsch et al. | 5,747,605 A | 5/1998 | Breant et al. |
| 5,169,530 A | 12/1992 | Schucker et al. | 5,766,479 A | 6/1998 | Collentro et al. |
| 5,180,407 A | 1/1993 | DeMarco | D396,046 S | 7/1998 | Scheel et al. |
| 5,182,019 A | 1/1993 | Cote et al. | 5,783,083 A | 7/1998 | Henshaw et al. |
| 5,186,821 A | 2/1993 | Murphy | D396,726 S | 8/1998 | Sadr et al. |
| 5,192,442 A | 3/1993 | Piccirillo et al. | 5,814,234 A | 9/1998 | Bower et al. |
| 5,192,456 A | 3/1993 | Ishida et al. | D400,890 S | 11/1998 | Gambardella |
| 5,192,478 A | 3/1993 | Caskey | 5,843,069 A | 12/1998 | Butler et al. |
| 5,194,149 A | 3/1993 | Selbie et al. | 5,846,424 A | 12/1998 | Khudenko |
| 5,198,116 A | 3/1993 | Comstock et al. | 5,846,425 A | 12/1998 | Whiteman |
| 5,198,162 A | 3/1993 | Park et al. | 5,871,823 A | 2/1999 | Anders et al. |
| 5,203,405 A | 4/1993 | Gentry et al. | 5,888,401 A | 3/1999 | Nguyen |
| 5,209,852 A | 5/1993 | Sunaoka et al. | 5,895,521 A | 4/1999 | Otsuka et al. |
| 5,211,823 A | 5/1993 | Giuffrida et al. | 5,895,570 A | 4/1999 | Liang |
| 5,221,478 A | 6/1993 | Dhingra et al. | 5,906,739 A | 5/1999 | Osterland et al. |
| 5,227,063 A | 7/1993 | Langerak et al. | 5,906,742 A | 5/1999 | Wang et al. |
| 5,248,424 A | 9/1993 | Cote et al. | 5,910,250 A | 6/1999 | Mahendran et al. |
| 5,262,054 A | 11/1993 | Wheeler | 5,914,039 A | 6/1999 | Mahendran et al. |
| 5,269,919 A | 12/1993 | von Medlin | 5,918,264 A | 6/1999 | Drummond et al. |
| 5,271,830 A | 12/1993 | Faivre et al. | 5,942,113 A | 8/1999 | Morimura |
| 5,275,766 A | 1/1994 | Gadkaree et al. | 5,944,997 A | 8/1999 | Pedersen et al. |
| 5,286,324 A | 2/1994 | Kawai et al. | 5,951,878 A | 9/1999 | Astrom |
| 5,290,451 A | 3/1994 | Koster et al. | 5,958,243 A | 9/1999 | Lawrence et al. |
| 5,290,457 A | 3/1994 | Karbachsch et al. | 5,961,830 A | 10/1999 | Barnett |
| 5,297,420 A | 3/1994 | Gilliland et al. | 5,968,357 A | 10/1999 | Doelle et al. |
| 5,316,671 A | 5/1994 | Murphy | 5,988,400 A | 11/1999 | Karachevtcev et al. |
| 5,320,760 A | 6/1994 | Freund et al. | 5,989,428 A | 11/1999 | Goronszy |
| 5,353,630 A | 10/1994 | Soda et al. | 5,997,745 A | 12/1999 | Tonelli et al. |
| 5,354,470 A | 10/1994 | Seita et al. | 6,001,254 A | 12/1999 | Espenan et al. |
| 5,358,732 A | 10/1994 | Seifter et al. | 6,007,712 A | 12/1999 | Tanaka et al. |
| 5,361,625 A | 11/1994 | Ylvisaker | 6,017,451 A | 1/2000 | Kopf |
| 5,364,527 A | 11/1994 | Zimmermann et al. | 6,024,872 A | 2/2000 | Mahendran et al. |
| 5,364,529 A | 11/1994 | Morin et al. | 6,036,030 A | 3/2000 | Stone et al. |
| 5,374,353 A | 12/1994 | Murphy | 6,039,872 A | 3/2000 | Wu et al. |
| 5,389,260 A | 2/1995 | Hemp et al. | 6,042,677 A | 3/2000 | Mahendran et al. |
| 5,393,433 A | 2/1995 | Espenan et al. | 6,045,698 A | 4/2000 | Cote et al. |
| 5,396,019 A | 3/1995 | Sartori et al. | 6,045,899 A | 4/2000 | Wang et al. |
| 5,401,401 A | 3/1995 | Hickok et al. | 6,048,454 A | 4/2000 | Jenkins |
| 5,401,405 A | 3/1995 | McDougald | 6,048,455 A | 4/2000 | Janik |
| 5,403,479 A | 4/1995 | Smith et al. | 6,066,401 A | 5/2000 | Stilburn |
| 5,405,528 A | 4/1995 | Selbie et al. | 6,071,404 A | 6/2000 | Tsui |
| 5,411,663 A | 5/1995 | Johnson | 6,074,718 A | 6/2000 | Puglia et al. |
| 5,417,101 A | 5/1995 | Weich | 6,077,435 A | 6/2000 | Beck et al. |
| 5,419,816 A | 5/1995 | Sampson et al. | 6,083,393 A | 7/2000 | Wu et al. |
| 5,425,415 A | 6/1995 | Master et al. | 6,096,213 A | 8/2000 | Radovanovic et al. |
| 5,451,317 A | 9/1995 | Ishida et al. | 6,113,782 A | 9/2000 | Leonard |
| 5,458,779 A | 10/1995 | Odegaard | 6,120,688 A | 9/2000 | Daly et al. |
| 5,468,397 A | 11/1995 | Barboza et al. | 6,126,819 A | 10/2000 | Heine et al. |
| 5,470,469 A | 11/1995 | Eckman | 6,146,747 A | 11/2000 | Wang et al. |
| 5,477,731 A | 12/1995 | Mouton | 6,149,817 A | 11/2000 | Peterson et al. |
| 5,479,590 A | 12/1995 | Lin | 6,156,200 A | 12/2000 | Zha et al. |
| 5,480,553 A | 1/1996 | Yamamori et al. | 6,159,373 A | 12/2000 | Beck et al. |
| 5,482,625 A | 1/1996 | Shimizu et al. | 6,193,890 B1 | 2/2001 | Pedersen et al. |
| 5,484,528 A | 1/1996 | Yagi et al. | 6,202,475 B1 | 3/2001 | Selbie et al. |
| 5,490,939 A | 2/1996 | Gerigk et al. | 6,214,231 B1 | 4/2001 | Cote et al. |
| 5,491,023 A | 2/1996 | Tsai et al. | 6,214,232 B1 | 4/2001 | Baurmeister et al. |
| 5,501,798 A | 3/1996 | Al-Samadi et al. | 6,221,247 B1 | 4/2001 | Nemser et al. |
| 5,525,220 A | 6/1996 | Yagi et al. | 6,245,239 B1 | 6/2001 | Cote et al. |
| 5,531,848 A | 7/1996 | Brinda et al. | 6,254,773 B1 | 7/2001 | Biltoft |
| 5,531,900 A | 7/1996 | Raghavan et al. | 6,264,839 B1 | 7/2001 | Mohr et al. |
| 5,543,002 A | 8/1996 | Brinda et al. | 6,277,512 B1 | 8/2001 | Hamrock et al. |
| 5,552,047 A | 9/1996 | Oshida et al. | 6,280,626 B1 | 8/2001 | Miyashita et al. |

| | | |
|---|---|---|
| 6,284,135 B1 | 9/2001 | Ookata |
| 6,290,756 B1 | 9/2001 | Macheras et al. |
| 6,294,039 B1 | 9/2001 | Mahendran et al. |
| 6,299,773 B1 | 10/2001 | Takamura et al. |
| 6,303,026 B1 | 10/2001 | Lindbo |
| 6,303,035 B1 | 10/2001 | Cote et al. |
| 6,315,895 B1 | 11/2001 | Summerton et al. |
| 6,319,411 B1 | 11/2001 | Cote |
| 6,322,703 B1 | 11/2001 | Taniguchi et al. |
| 6,324,898 B1 | 12/2001 | Cote et al. |
| 6,325,928 B1 | 12/2001 | Pedersen et al. |
| 6,325,938 B1 | 12/2001 | Miyashita et al. |
| 6,331,248 B1 | 12/2001 | Taniguchi et al. |
| 6,337,018 B1 | 1/2002 | Mickols |
| RE37,549 E | 2/2002 | Mahendran et al. |
| 6,349,835 B1 | 2/2002 | Saux et al. |
| 6,354,444 B1 | 3/2002 | Mahendran et al. |
| 6,361,695 B1 | 3/2002 | Husain et al. |
| 6,368,819 B1 | 4/2002 | Gaddy et al. |
| 6,372,138 B1 | 4/2002 | Cho et al. |
| 6,375,848 B1 | 4/2002 | Cote et al. |
| 6,383,369 B2 | 5/2002 | Elston |
| 6,387,189 B1 | 5/2002 | Groschl et al. |
| 6,402,955 B2 | 6/2002 | Ookata |
| 6,406,629 B1 | 6/2002 | Husain et al. |
| 6,423,214 B1 | 7/2002 | Lindbo |
| 6,423,784 B1 | 7/2002 | Hamrock et al. |
| 6,432,310 B1 | 8/2002 | Andou et al. |
| 6,440,303 B2 | 8/2002 | Spriegel |
| D462,699 S | 9/2002 | Johnson et al. |
| 6,444,124 B1 | 9/2002 | Onyeche et al. |
| 6,468,430 B1 | 10/2002 | Kimura et al. |
| 6,471,869 B1 | 10/2002 | Yanou et al. |
| 6,485,645 B1 | 11/2002 | Husain et al. |
| 6,495,041 B2 | 12/2002 | Taniguchi et al. |
| 6,517,723 B1 | 2/2003 | Daigger et al. |
| 6,524,481 B2 | 2/2003 | Zha et al. |
| 6,524,733 B1 | 2/2003 | Nonobe |
| 6,550,747 B1 | 4/2003 | Rabie et al. |
| 6,555,005 B1 | 4/2003 | Zha et al. |
| 6,562,237 B1 | 5/2003 | Olaopa |
| 6,576,136 B1 | 6/2003 | De Moel et al. |
| 6,592,762 B2 | 7/2003 | Smith |
| D478,913 S | 8/2003 | Johnson et al. |
| 6,613,222 B2 | 9/2003 | Mikkelson et al. |
| 6,620,319 B2 | 9/2003 | Behmann et al. |
| 6,623,643 B2 | 9/2003 | Steward et al. |
| 6,627,082 B2 | 9/2003 | Del Vecchio et al. |
| 6,632,358 B1 | 10/2003 | Suga et al. |
| 6,635,179 B1 | 10/2003 | Summerton et al. |
| 6,641,733 B2 | 11/2003 | Zha et al. |
| 6,645,374 B2 | 11/2003 | Cote et al. |
| 6,656,356 B2 | 12/2003 | Gungerich et al. |
| 6,682,652 B2 | 1/2004 | Mahendran et al. |
| 6,685,832 B2 | 2/2004 | Mahendran et al. |
| 6,696,465 B2 | 2/2004 | Dellaria et al. |
| 6,702,561 B2 | 3/2004 | Stillig et al. |
| 6,706,185 B2 | 3/2004 | Goel et al. |
| 6,706,189 B2 | 3/2004 | Rabie et al. |
| 6,708,957 B2 | 3/2004 | Cote et al. |
| 6,712,970 B1 | 3/2004 | Trivedi |
| 6,721,529 B2 | 4/2004 | Chen et al. |
| 6,723,242 B1 | 4/2004 | Ohkata et al. |
| 6,723,758 B2 | 4/2004 | Stone et al. |
| 6,727,305 B1 | 4/2004 | Pavez Aranguiz |
| 6,743,362 B1 | 6/2004 | Porteous et al. |
| 6,755,970 B1 | 6/2004 | Knappe et al. |
| 6,758,972 B2 | 7/2004 | Vriens et al. |
| 6,761,826 B2 | 7/2004 | Bender |
| 6,770,202 B1 | 8/2004 | Kidd et al. |
| 6,780,466 B2 | 8/2004 | Grangeon et al. |
| 6,783,008 B2 | 8/2004 | Zha et al. |
| 6,790,347 B2 | 9/2004 | Jeong et al. |
| 6,790,912 B2 | 9/2004 | Blong |
| 6,805,806 B2 | 10/2004 | Arnaud |
| 6,808,629 B2 | 10/2004 | Wouters-Wasiak et al. |
| 6,811,696 B2 | 11/2004 | Wang et al. |
| 6,814,861 B2 | 11/2004 | Husain et al. |
| 6,821,420 B2 | 11/2004 | Zha et al. |
| 6,830,782 B2 | 12/2004 | Kanazawa |
| 6,841,070 B2 | 1/2005 | Zha et al. |
| 6,861,466 B2 | 3/2005 | Dadalas et al. |
| 6,863,816 B2 | 3/2005 | Austin et al. |
| 6,863,817 B2 | 3/2005 | Liu et al. |
| 6,863,818 B2 | 3/2005 | Daigger et al. |
| 6,863,823 B2 | 3/2005 | Cote |
| 6,869,534 B2 | 3/2005 | McDowell et al. |
| 6,872,305 B2 | 3/2005 | Johnson et al. |
| 6,881,343 B2 | 4/2005 | Rabie et al. |
| 6,884,350 B2 | 4/2005 | Muller |
| 6,884,375 B2 | 4/2005 | Wang et al. |
| 6,890,435 B2 | 5/2005 | Ji et al. |
| 6,890,645 B2 | 5/2005 | Disse et al. |
| 6,893,568 B1 | 5/2005 | Janson et al. |
| 6,899,812 B2 | 5/2005 | Cote et al. |
| 6,936,085 B2 | 8/2005 | DeMarco |
| 6,946,073 B2 | 9/2005 | Daigger et al. |
| 6,952,258 B2 | 10/2005 | Ebert et al. |
| 6,955,762 B2 | 10/2005 | Gallagher et al. |
| 6,962,258 B2 | 11/2005 | Zha et al. |
| 6,964,741 B2 | 11/2005 | Mahendran et al. |
| 6,969,465 B2 | 11/2005 | Zha et al. |
| 6,974,554 B2 | 12/2005 | Cox et al. |
| 6,994,867 B1 | 2/2006 | Hossainy et al. |
| 7,005,100 B2 | 2/2006 | Lowell |
| 7,014,763 B2 | 3/2006 | Johnson et al. |
| 7,018,530 B2 | 3/2006 | Pollock |
| 7,018,533 B2 | 3/2006 | Johnson et al. |
| 7,022,233 B2 | 4/2006 | Chen |
| 7,041,728 B2 | 5/2006 | Zipplies et al. |
| 7,052,610 B2 | 5/2006 | Janson et al. |
| 7,083,733 B2 | 8/2006 | Freydina et al. |
| 7,087,173 B2 | 8/2006 | Cote et al. |
| 7,122,121 B1 | 10/2006 | Ji |
| 7,147,777 B1 | 12/2006 | Porteous |
| 7,147,778 B1 | 12/2006 | DiMassimo et al. |
| 7,160,455 B2 | 1/2007 | Taniguchi et al. |
| 7,160,463 B2 | 1/2007 | Beck et al. |
| 7,160,464 B2 | 1/2007 | Lee et al. |
| 7,172,699 B1 | 2/2007 | Trivedi et al. |
| 7,172,701 B2 | 2/2007 | Gaid et al. |
| 7,186,344 B2 | 3/2007 | Hughes |
| 7,208,091 B2 | 4/2007 | Pind et al. |
| 7,223,340 B2 | 5/2007 | Zha et al. |
| 7,226,541 B2 | 6/2007 | Muller et al. |
| 7,247,238 B2 | 7/2007 | Mullette et al. |
| 7,264,716 B2 | 9/2007 | Johnson et al. |
| 7,279,100 B2 | 10/2007 | Devine |
| 7,279,215 B2 | 10/2007 | Hester et al. |
| 7,300,022 B2 | 11/2007 | Muller |
| 7,314,563 B2 | 1/2008 | Cho et al. |
| 7,329,344 B2 | 2/2008 | Jordan et al. |
| 7,344,645 B2 | 3/2008 | Beck et al. |
| 7,361,274 B2 | 4/2008 | Lazaredes |
| 7,378,024 B2 | 5/2008 | Bartels et al. |
| 7,387,723 B2 | 6/2008 | Jordan |
| 7,404,896 B2 | 7/2008 | Muller |
| 7,455,765 B2 | 11/2008 | Elefritz et al. |
| 7,481,933 B2 | 1/2009 | Barnes |
| 7,510,655 B2 | 3/2009 | Barnes |
| 7,531,042 B2 | 5/2009 | Murkute et al. |
| 7,563,363 B2 | 7/2009 | Kuzma |
| 7,591,950 B2 | 9/2009 | Zha et al. |
| 7,632,439 B2 | 12/2009 | Mullette et al. |
| 7,662,212 B2 | 2/2010 | Mullette et al. |
| 7,708,887 B2 | 5/2010 | Johnson et al. |
| 7,713,413 B2 | 5/2010 | Barnes |
| 7,718,057 B2 | 5/2010 | Jordan et al. |
| 7,718,065 B2 | 5/2010 | Jordan |
| 7,722,769 B2 | 5/2010 | Jordan et al. |
| 7,761,826 B1 | 7/2010 | Thanvantri et al. |
| 7,819,956 B2 | 10/2010 | Muller |
| 7,850,851 B2 | 12/2010 | Zha et al. |
| 7,862,719 B2 | 1/2011 | McMahon et al. |
| 7,931,463 B2 | 4/2011 | Cox et al. |
| 7,938,966 B2 | 5/2011 | Johnson |
| 2001/0047962 A1 | 12/2001 | Zha et al. |
| 2001/0052494 A1 | 12/2001 | Cote et al. |

| | | | | | | |
|---|---|---|---|---|---|---|
| 2002/0070157 A1 | 6/2002 | Yamada | | 2007/0007214 A1 | 1/2007 | Zha et al. |
| 2002/0117444 A1 | 8/2002 | Mikkelson et al. | | 2007/0039888 A1 | 2/2007 | Ginzburg et al. |
| 2002/0148767 A1 | 10/2002 | Johnson et al. | | 2007/0045183 A1 | 3/2007 | Murphy |
| 2002/0153313 A1 | 10/2002 | Cote | | 2007/0051679 A1 | 3/2007 | Adams et al. |
| 2002/0185435 A1 | 12/2002 | Husain et al. | | 2007/0056904 A1 | 3/2007 | Hogt et al. |
| 2002/0189999 A1 | 12/2002 | Espenan et al. | | 2007/0056905 A1 | 3/2007 | Beck et al. |
| 2002/0195390 A1 | 12/2002 | Zha et al. | | 2007/0075017 A1 | 4/2007 | Kuzma |
| 2003/0038080 A1 | 2/2003 | Vriens et al. | | 2007/0075021 A1 | 4/2007 | Johnson |
| 2003/0042199 A1 | 3/2003 | Smith | | 2007/0084791 A1 | 4/2007 | Jordan et al. |
| 2003/0052055 A1 | 3/2003 | Akamatsu et al. | | 2007/0084795 A1 | 4/2007 | Jordan |
| 2003/0056919 A1 | 3/2003 | Beck | | 2007/0108125 A1 | 5/2007 | Cho et al. |
| 2003/0057155 A1 | 3/2003 | Husain et al. | | 2007/0138090 A1 | 6/2007 | Jordan et al. |
| 2003/0075495 A1 | 4/2003 | Dannstrom et al. | | 2007/0170112 A1 | 7/2007 | Elefritz et al. |
| 2003/0121855 A1 | 7/2003 | Kopp | | 2007/0181496 A1 | 8/2007 | Zuback |
| 2003/0127388 A1 | 7/2003 | Ando et al. | | 2007/0227973 A1 | 10/2007 | Zha et al. |
| 2003/0146153 A1 | 8/2003 | Cote et al. | | 2008/0053923 A1 | 3/2008 | Beck et al. |
| 2003/0150807 A1 | 8/2003 | Bartels et al. | | 2008/0093297 A1 | 4/2008 | Gock et al. |
| 2003/0159988 A1 | 8/2003 | Daigger et al. | | 2008/0156745 A1 | 7/2008 | Zha et al. |
| 2003/0178365 A1 | 9/2003 | Zha et al. | | 2008/0179249 A1 | 7/2008 | Beck et al. |
| 2003/0196955 A1 | 10/2003 | Hughes | | 2008/0190846 A1 | 8/2008 | Cox et al. |
| 2003/0226797 A1 | 12/2003 | Phelps | | 2008/0203017 A1 | 8/2008 | Zha et al. |
| 2003/0234221 A1 | 12/2003 | Johnson et al. | | 2008/0257822 A1 | 10/2008 | Johnson |
| 2004/0007523 A1 | 1/2004 | Gabon et al. | | 2008/0277340 A1 | 11/2008 | Hong et al. |
| 2004/0007525 A1 | 1/2004 | Rabie et al. | | 2009/0001018 A1 | 1/2009 | Zha et al. |
| 2004/0035770 A1 | 2/2004 | Edwards et al. | | 2009/0194477 A1 | 8/2009 | Hashimoto |
| 2004/0045893 A1 | 3/2004 | Watanabe et al. | | 2009/0223895 A1 | 9/2009 | Zha et al. |
| 2004/0050791 A1 | 3/2004 | Herczeg | | 2009/0255873 A1 | 10/2009 | Biltoft et al. |
| 2004/0055974 A1 | 3/2004 | Del Vecchio et al. | | 2010/0000941 A1 | 1/2010 | Muller |
| 2004/0084369 A1 | 5/2004 | Zha et al. | | 2010/0012585 A1 | 1/2010 | Zha et al. |
| 2004/0108268 A1 | 6/2004 | Liu et al. | | 2010/0025320 A1 | 2/2010 | Johnson |
| 2004/0112831 A1 | 6/2004 | Rabie et al. | | 2010/0051545 A1 | 3/2010 | Johnson et al. |
| 2004/0139992 A1 | 7/2004 | Murkute et al. | | 2010/0170847 A1 | 7/2010 | Zha et al. |
| 2004/0145076 A1 | 7/2004 | Zha et al. | | 2010/0200503 A1 | 8/2010 | Zha et al. |
| 2004/0149655 A1 | 8/2004 | Petrucco et al. | | 2010/0300968 A1 | 12/2010 | Liu et al. |
| 2004/0154671 A1 | 8/2004 | Martins et al. | | 2010/0326906 A1 | 12/2010 | Barnes |
| 2004/0168978 A1 | 9/2004 | Gray | | 2011/0049047 A1 | 3/2011 | Cumin et al. |
| 2004/0168979 A1 | 9/2004 | Zha et al. | | 2011/0056522 A1 | 3/2011 | Zauner et al. |
| 2004/0173525 A1 | 9/2004 | Hunniford et al. | | 2011/0100907 A1 | 5/2011 | Zha et al. |
| 2004/0178154 A1 | 9/2004 | Zha et al. | | 2011/0114557 A2 | 5/2011 | Johnson et al. |
| 2004/0188341 A1 | 9/2004 | Zha et al. | | 2011/0127209 A1 | 6/2011 | Rogers et al. |
| 2004/0211726 A1 | 10/2004 | Baig et al. | | 2011/0132826 A1 | 6/2011 | Muller et al. |
| 2004/0217053 A1 | 11/2004 | Zha et al. | | 2011/0139715 A1 | 6/2011 | Zha et al. |
| 2004/0222158 A1 | 11/2004 | Husain et al. | | 2011/0192783 A1 | 8/2011 | Cox et al. |
| 2004/0232076 A1 | 11/2004 | Zha et al. | | 2011/0198283 A1 | 8/2011 | Zha et al. |
| 2004/0238442 A1 | 12/2004 | Johnson et al. | | 2012/0091602 A1 | 4/2012 | Cumin et al. |
| 2004/0245174 A1 | 12/2004 | Takayama et al. | | | | |
| 2005/0006308 A1 | 1/2005 | Cote et al. | | FOREIGN PATENT DOCUMENTS | | |
| 2005/0023219 A1 | 2/2005 | Kirker et al. | | AU | 77066/87 A | 2/1988 |
| 2005/0029185 A1 | 2/2005 | Muller | | AU | 762091 B2 | 6/2003 |
| 2005/0029186 A1 | 2/2005 | Muller | | CA | 2531764 A1 | 3/2005 |
| 2005/0032982 A1 | 2/2005 | Muller | | CN | 86104888 A | 2/1988 |
| 2005/0045557 A1 | 3/2005 | Daigger et al. | | CN | 1050770 | 1/1995 |
| 2005/0061725 A1 | 3/2005 | Liu et al. | | CN | 2204898 Y | 8/1995 |
| 2005/0077227 A1 | 4/2005 | Kirker et al. | | CN | 2236049 Y | 9/1996 |
| 2005/0098494 A1 | 5/2005 | Mullette et al. | | CN | 1159769 A | 9/1997 |
| 2005/0103722 A1 | 5/2005 | Freydina et al. | | CN | 1249698 A | 4/2000 |
| 2005/0109692 A1* | 5/2005 | Zha et al. ............ 210/321.69 | | CN | 1541757 A | 11/2004 |
| 2005/0115880 A1 | 6/2005 | Pollock | | DE | 3904544 A1 | 8/1990 |
| 2005/0115899 A1 | 6/2005 | Liu et al. | | DE | 4117281 A1 | 1/1992 |
| 2005/0121389 A1 | 6/2005 | Janson et al. | | DE | 4113420 A1 | 10/1992 |
| 2005/0126963 A1 | 6/2005 | Phagoo et al. | | DE | 4117422 C1 | 11/1992 |
| 2005/0139538 A1 | 6/2005 | Lazaredes | | DE | 4326603 A1 | 2/1995 |
| 2005/0184008 A1 | 8/2005 | Schacht et al. | | DE | 19503060 A1 | 8/1996 |
| 2005/0194310 A1 | 9/2005 | Yamamoto et al. | | DE | 29804927 U1 | 6/1998 |
| 2005/0194315 A1 | 9/2005 | Adams et al. | | DE | 29906389 U1 | 6/1999 |
| 2005/0258098 A1 | 11/2005 | Vincent et al. | | DE | 10209170 C1 | 8/2003 |
| 2006/0000775 A1 | 1/2006 | Zha et al. | | EP | 012557 B1 | 2/1983 |
| 2006/0021929 A1 | 2/2006 | Mannheim et al. | | EP | 126714 A2 | 11/1984 |
| 2006/0065596 A1 | 3/2006 | Kent et al. | | EP | 050447 B1 | 10/1985 |
| 2006/0081533 A1 | 4/2006 | Khudenko | | EP | 194735 A2 | 9/1986 |
| 2006/0131234 A1 | 6/2006 | Zha et al. | | EP | 250337 A1 | 12/1987 |
| 2006/0201876 A1 | 9/2006 | Jordan | | EP | 327025 A1 | 8/1989 |
| 2006/0201879 A1 | 9/2006 | Den Boestert et al. | | EP | 344633 A1 | 12/1989 |
| 2006/0249448 A1 | 11/2006 | Fujishima et al. | | EP | 090383 B1 | 5/1990 |
| 2006/0249449 A1 | 11/2006 | Nakhla et al. | | EP | 407900 A2 | 1/1991 |
| 2006/0261007 A1 | 11/2006 | Zha et al. | | EP | 463627 A2 | 1/1992 |
| 2006/0273007 A1 | 12/2006 | Zha et al. | | EP | 0464321 A1 | 1/1992 |
| 2006/0273038 A1 | 12/2006 | Syed et al. | | EP | 492942 A2 | 7/1992 |
| 2007/0007205 A1 | 1/2007 | Johnson et al. | | EP | 518250 B1 | 12/1992 |

| | | | | | | |
|---|---|---|---|---|---|---|
| EP | 547575 | A1 | 6/1993 | JP | 64-075542 A | 3/1989 |
| EP | 280052 | B1 | 7/1994 | JP | 1-501046 T | 4/1989 |
| EP | 395133 | B1 | 2/1995 | JP | 1111494 | 4/1989 |
| EP | 662341 | A1 | 7/1995 | JP | 01151906 | 6/1989 |
| EP | 492446 | B1 | 11/1995 | JP | 01-307409 A | 12/1989 |
| EP | 430082 | B1 | 6/1996 | JP | 02-017925 | 1/1990 |
| EP | 734758 | A1 | 10/1996 | JP | 02017924 | 1/1990 |
| EP | 763758 | A1 | 3/1997 | JP | 02026625 A | 1/1990 |
| EP | 824956 | A2 | 2/1998 | JP | 02031200 A | 2/1990 |
| EP | 848194 | A2 | 6/1998 | JP | 02040296 A | 2/1990 |
| EP | 855214 | A1 | 7/1998 | JP | 02107318 A | 4/1990 |
| EP | 627255 | B1 | 1/1999 | JP | 02126922 A | 5/1990 |
| EP | 911073 | A1 | 4/1999 | JP | 02144132 A | 6/1990 |
| EP | 920904 | A2 | 6/1999 | JP | 02164423 A | 6/1990 |
| EP | 0937494 | A2 | 8/1999 | JP | 02174918 A | 7/1990 |
| EP | 1034835 | A1 | 9/2000 | JP | 02241523 A | 9/1990 |
| EP | 1052012 | A1 | 11/2000 | JP | 02277528 A | 11/1990 |
| EP | 1156015 | A1 | 11/2001 | JP | 02284035 A | 11/1990 |
| EP | 1300186 | A1 | 4/2003 | JP | 03018373 A | 1/1991 |
| EP | 1349644 | B1 | 10/2003 | JP | 03028797 A | 2/1991 |
| EP | 1350555 | A1 | 10/2003 | JP | 03-086529 A | 4/1991 |
| EP | 1236503 | B1 | 8/2004 | JP | 03110445 A | 5/1991 |
| EP | 1445240 | | 8/2004 | JP | 04108518 A | 4/1992 |
| EP | 1466658 | A1 | 10/2004 | JP | 04110023 A | 4/1992 |
| EP | 1659171 | A1 | 5/2006 | JP | 4-190889 A | 7/1992 |
| EP | 1420874 | B1 | 1/2011 | JP | 04187224 A | 7/1992 |
| FR | 2620712 | A1 | 3/1989 | JP | 4-256425 A | 9/1992 |
| FR | 2674448 | A1 | 10/1992 | JP | 04250898 A | 9/1992 |
| FR | 2699424 | A1 | 6/1994 | JP | 04256424 A | 9/1992 |
| FR | 2762834 | A1 | 11/1998 | JP | 04265128 A | 9/1992 |
| GB | 702911 | A | 1/1954 | JP | 04293527 A | 10/1992 |
| GB | 996195 | A | 6/1965 | JP | 04310223 A | 11/1992 |
| GB | 2253572 | A | 9/1992 | JP | 04317793 A | 11/1992 |
| JP | 52-078677 | A | 7/1977 | JP | 04334530 A | 11/1992 |
| JP | 53-5077 | | 1/1978 | JP | 04348252 A | 12/1992 |
| JP | 53108882 | A | 9/1978 | JP | 05023557 A | 2/1993 |
| JP | 54162684 | A | 12/1979 | JP | 05096136 A | 4/1993 |
| JP | 55099703 | A | 7/1980 | JP | 05137977 A | 6/1993 |
| JP | 55129107 | A | 10/1980 | JP | 05157654 A | 6/1993 |
| JP | 55129155 | A | 10/1980 | JP | 05161831 A | 6/1993 |
| JP | 56021604 | A | 2/1981 | JP | 05279447 A | 10/1993 |
| JP | 56118701 | A | 9/1981 | JP | 05285348 A | 11/1993 |
| JP | 56121685 | A | 9/1981 | JP | 05305221 A | 11/1993 |
| JP | 57190697 | A | 11/1982 | JP | 06-027215 A | 2/1994 |
| JP | 58088007 | A | 5/1983 | JP | 06071120 A | 3/1994 |
| JP | 60019002 | A | 1/1985 | JP | 06114240 A | 4/1994 |
| JP | 60-206412 | A | 10/1985 | JP | 06170364 A | 6/1994 |
| JP | 60260628 | A | 12/1985 | JP | 06190250 A | 7/1994 |
| JP | 61097005 | A | 5/1986 | JP | 06218237 A | 8/1994 |
| JP | 61097006 | A | 5/1986 | JP | 06238273 A | 8/1994 |
| JP | 61107905 | A | 5/1986 | JP | 06-292820 A | 10/1994 |
| JP | 61167406 | A | 7/1986 | JP | 06277469 A | 10/1994 |
| JP | 61167407 | A | 7/1986 | JP | 06285496 A | 10/1994 |
| JP | 61171504 | A | 8/1986 | JP | 06343837 A | 12/1994 |
| JP | 61192309 | A | 8/1986 | JP | 07000770 A | 1/1995 |
| JP | 61222510 | A | 10/1986 | JP | 07024272 A | 1/1995 |
| JP | 61242607 | A | 10/1986 | JP | 07047247 A | 2/1995 |
| JP | 61249505 | A | 11/1986 | JP | 07068139 A | 3/1995 |
| JP | 61257203 | A | 11/1986 | JP | 07136470 A | 5/1995 |
| JP | 61263605 | A | 11/1986 | JP | 07136471 A | 5/1995 |
| JP | 61291007 | A | 12/1986 | JP | 07155564 A | 6/1995 |
| JP | 61293504 | A | 12/1986 | JP | 07155758 A | 6/1995 |
| JP | 62004408 | A | 1/1987 | JP | 7-39921 | 7/1995 |
| JP | 62068828 | A | 3/1987 | JP | 07178323 A | 7/1995 |
| JP | 62114609 | A | 5/1987 | JP | 07185268 A | 7/1995 |
| JP | 62140607 | A | 6/1987 | JP | 07185270 A | 7/1995 |
| JP | 62144708 | A | 6/1987 | JP | 07185271 A | 7/1995 |
| JP | 62163708 | A | 7/1987 | JP | 07185272 A | 7/1995 |
| JP | 62179540 | A | 8/1987 | JP | 07236819 A | 9/1995 |
| JP | 62237908 | A | 10/1987 | JP | 07-256253 | 10/1995 |
| JP | 62250908 | A | 10/1987 | JP | 07251043 A | 10/1995 |
| JP | 62187606 | | 11/1987 | JP | 07275665 A | 10/1995 |
| JP | 62262710 | A | 11/1987 | JP | 07289860 A | 11/1995 |
| JP | 63097634 | A | 4/1988 | JP | 07303895 A | 11/1995 |
| JP | 63099246 | A | 4/1988 | JP | 07313973 A | 12/1995 |
| JP | 63143905 | A | 6/1988 | JP | 08010585 A | 1/1996 |
| JP | 63171607 | A | 7/1988 | JP | 8039089 A | 2/1996 |
| JP | 63180254 | A | 7/1988 | JP | 08-197053 A | 8/1996 |
| JP | S63-38884 | | 10/1988 | JP | 08323161 A | 12/1996 |

| | | | | | | |
|---|---|---|---|---|---|---|
| JP | 08332357 A | 12/1996 | JP | 2002263407 A | 9/2002 |
| JP | 09000890 A | 1/1997 | JP | 2002-336663 | 11/2002 |
| JP | 09038470 A | 2/1997 | JP | 2003024751 | 1/2003 |
| JP | 09-075689 A | 3/1997 | JP | 2003047830 A | 2/2003 |
| JP | 09072993 A | 3/1997 | JP | 2003053157 A | 2/2003 |
| JP | 09099227 A | 4/1997 | JP | 2003053160 A | 2/2003 |
| JP | 9103661 A | 4/1997 | JP | 200371254 A | 3/2003 |
| JP | 9138298 A | 5/1997 | JP | 2003062436 A | 3/2003 |
| JP | 09141063 A | 6/1997 | JP | 2003135935 A | 5/2003 |
| JP | 09155345 A | 6/1997 | JP | 2003190976 A | 7/2003 |
| JP | 09187628 A | 7/1997 | JP | 2003-265597 | 9/2003 |
| JP | 09192458 A | 7/1997 | JP | 2003-275548 A | 9/2003 |
| JP | 09220569 A | 8/1997 | JP | 2003266072 A | 9/2003 |
| JP | 09271641 A | 10/1997 | JP | 2003275759 A | 9/2003 |
| JP | 09-313902 A | 12/1997 | JP | 2003340250 A | 12/2003 |
| JP | 09324067 A | 12/1997 | JP | 2004-008981 | 1/2004 |
| JP | 10-015365 A | 1/1998 | JP | 2004-230287 A | 8/2004 |
| JP | 10024222 A | 1/1998 | JP | 2004230280 A | 8/2004 |
| JP | 10033955 A | 2/1998 | JP | 2004322100 A | 11/2004 |
| JP | 10048466 A | 2/1998 | JP | 2004337730 A | 12/2004 |
| JP | 10076144 A | 3/1998 | JP | 2005-087887 A | 4/2005 |
| JP | 10076264 A | 3/1998 | JP | 2005144291 A | 6/2005 |
| JP | 10085562 A | 4/1998 | JP | 2005154551 A | 6/2005 |
| JP | 10085565 A | 4/1998 | JP | 2005279447 A | 10/2005 |
| JP | 10085566 A | 4/1998 | JP | 2006-116495 | 5/2006 |
| JP | 10156149 A | 6/1998 | JP | 2007-547083 | 8/2010 |
| JP | 10180048 A | 7/1998 | JP | 4833353 B2 | 12/2011 |
| JP | 10225685 A | 8/1998 | KR | 20-0232145 | 7/2001 |
| JP | 10235168 A | 9/1998 | KR | 1020020067227 | 8/2002 |
| JP | 10286441 A | 10/1998 | KR | 20-0295350 | 11/2002 |
| JP | 10328538 A | 12/1998 | KR | 2002-0090967 | 12/2002 |
| JP | 11005023 A | 1/1999 | KR | 2003-033812 | 5/2003 |
| JP | 11028467 A | 2/1999 | KR | 2003-060625 | 7/2003 |
| JP | 11031025 A | 2/1999 | KR | 2005-063478 | 6/2005 |
| JP | 11033365 A | 2/1999 | NL | 1020491 C | 10/2003 |
| JP | 11033367 A | 2/1999 | NL | 1021197 C | 10/2003 |
| JP | 11076769 A | 3/1999 | NZ | 510394 A | 5/2003 |
| JP | 11156166 A | 6/1999 | NZ | 537874 A | 2/2007 |
| JP | 11156360 A | 6/1999 | TW | 347343 | 12/1998 |
| JP | 11165200 A | 6/1999 | WO | 1985001449 A1 | 4/1985 |
| JP | 11-179171 A | 7/1999 | WO | 1986005116 A1 | 9/1986 |
| JP | 11-309351 A | 11/1999 | WO | 1986005705 A1 | 10/1986 |
| JP | 11302438 A | 11/1999 | WO | 8800494 A1 | 1/1988 |
| JP | 11319501 A | 11/1999 | WO | 8801529 A1 | 3/1988 |
| JP | 11319507 A | 11/1999 | WO | 8801895 A1 | 3/1988 |
| JP | 11333265 A | 12/1999 | WO | 8806200 A1 | 8/1988 |
| JP | 2000000439 A | 1/2000 | WO | 8900880 A1 | 2/1989 |
| JP | 2000051669 A | 2/2000 | WO | 9000434 A1 | 1/1990 |
| JP | 2000061466 A | 2/2000 | WO | 9104783 A1 | 4/1991 |
| JP | 200079390 A | 3/2000 | WO | 9116124 A1 | 10/1991 |
| JP | 2000070684 A | 3/2000 | WO | 9302779 A1 | 2/1993 |
| JP | 2000-093758 | 4/2000 | WO | 9315827 A1 | 8/1993 |
| JP | 2000-157845 | 6/2000 | WO | 9323152 A1 | 11/1993 |
| JP | 2000157850 A | 6/2000 | WO | 9411094 A1 | 5/1994 |
| JP | 2000185220 A | 7/2000 | WO | 9534424 A1 | 12/1995 |
| JP | 2000189958 A | 7/2000 | WO | 9603202 A1 | 2/1996 |
| JP | 2000233020 A | 8/2000 | WO | 9607470 A1 | 3/1996 |
| JP | 2000237548 A | 9/2000 | WO | 9628236 A1 | 9/1996 |
| JP | 2000300968 A | 10/2000 | WO | 199629142 A1 | 9/1996 |
| JP | 2000317276 A | 11/2000 | WO | 9641676 A1 | 12/1996 |
| JP | 2000-334276 A | 12/2000 | WO | 9706880 A2 | 2/1997 |
| JP | 2000342932 A | 12/2000 | WO | 9822204 A1 | 5/1998 |
| JP | 2001009246 A | 1/2001 | WO | 9825694 A1 | 6/1998 |
| JP | 2001070967 A | 3/2001 | WO | 9828066 A1 | 7/1998 |
| JP | 2001079366 A | 3/2001 | WO | 9853902 A1 | 12/1998 |
| JP | 2001079367 A | 3/2001 | WO | 9901207 A1 | 1/1999 |
| JP | 2001104760 A | 4/2001 | WO | 99-55448 A1 | 11/1999 |
| JP | 2001120963 A | 5/2001 | WO | 9959707 A1 | 11/1999 |
| JP | 2001-510396 T | 7/2001 | WO | 0018498 A1 | 4/2000 |
| JP | 2001179059 A | 7/2001 | WO | 0030742 A1 | 6/2000 |
| JP | 2001179060 A | 7/2001 | WO | 0100307 A2 | 1/2001 |
| JP | 2001190937 A | 7/2001 | WO | 0105715 A1 | 1/2001 |
| JP | 2001190938 A | 7/2001 | WO | 0108790 A1 | 2/2001 |
| JP | 2001205055 A | 7/2001 | WO | 0119414 A1 | 3/2001 |
| JP | 2001-269546 | 10/2001 | WO | 0132299 A1 | 5/2001 |
| JP | 2002177746 A | 6/2002 | WO | 0136075 A1 | 5/2001 |
| JP | 3302992 B2 | 7/2002 | WO | 0143856 A1 | 6/2001 |
| JP | 2002-527229 A | 8/2002 | WO | 0145829 A1 | 6/2001 |
| JP | 2002525197 T | 8/2002 | WO | 0226363 A2 | 4/2002 |

| | | | |
|---|---|---|---|
| WO | 0230550 A1 | 4/2002 |
| WO | 0240140 A1 | 5/2002 |
| WO | 0247800 A1 | 6/2002 |
| WO | 03000389 A2 | 1/2003 |
| WO | 03013706 A1 | 2/2003 |
| WO | 03024575 A1 | 3/2003 |
| WO | 03053552 A1 | 7/2003 |
| WO | 03057632 A1 | 7/2003 |
| WO | 03059495 A1 | 7/2003 |
| WO | 03068374 A1 | 8/2003 |
| WO | 03095078 A1 | 11/2003 |
| WO | 2004018084 A1 | 3/2004 |
| WO | 2004024304 A2 | 3/2004 |
| WO | 2004033078 A1 | 4/2004 |
| WO | 2004050221 A1 | 6/2004 |
| WO | 2004056458 A3 | 7/2004 |
| WO | 2004078327 A1 | 9/2004 |
| WO | 2004101120 A1 | 11/2004 |
| WO | 2005005028 A1 | 1/2005 |
| WO | 2005021140 A1 | 3/2005 |
| WO | 2005028085 A1 | 3/2005 |
| WO | 2005028086 A1 | 3/2005 |
| WO | 2005037414 A1 | 4/2005 |
| WO | 2005046849 A1 | 5/2005 |
| WO | 2005077499 A1 | 8/2005 |
| WO | 2005082498 A1 | 9/2005 |
| WO | 2005107929 A2 | 11/2005 |
| WO | 2006026814 A1 | 3/2006 |
| WO | 2006029456 A1 | 3/2006 |
| WO | 2006029465 | 3/2006 |
| WO | 2006047814 A1 | 5/2006 |
| WO | 2006066350 A1 | 6/2006 |
| WO | 2007053528 A2 | 5/2007 |
| WO | 2007065956 A1 | 6/2007 |
| WO | 2007135087 A1 | 11/2007 |
| WO | 2008034570 A1 | 3/2008 |
| WO | 2008153818 A1 | 12/2008 |
| WO | 2009030405 A1 | 3/2009 |

OTHER PUBLICATIONS

Almulla et al., Desalination, 153 (2002), pp. 237-243.
Anonymous, "Nonwoven Constructions of Dyneon "THV and Dyneon "The Fluorothermoplastics", Research Disclosure Journal, Apr. 1999, RD 420013, 2 pages.
Cote et al., Wat. Sci. Tech. 38(4-5) (1998), pp. 437-442.
Cote, et al. "A New Immersed Membrane for Pretreatment to Reverse Osmosis" Desalination 139 (2001) 229-236.
Crawford et al., "Procurement of Membrane Equipment: Differences Between Water Treatment and Membrane Bioreactor (MBR) Applications" (2003).
Davis et al., Membrane Technology Conference, "Membrane Bioreactor Evaluation for Water Reuse in Seattle, Washington" (2003).
DeCarolis et al., Membrane Technology Conference, "Optimization of Various MBR Systems for Water Reclamation" (2003).
Delgrange-Vincent, N. et al., Desalination 131 (2000) 353-362.
Dow Chemicals Company, "Filmtec Membranes—Cleaning Procedures for Filmtec FT30 Elements," Tech Facts, Online, Jun. 30, 2000, XP002237568.
European Search Report dated Oct. 27, 2011 for Application No. 11177702.5.
Husain, H. et al., "The ZENON experience with membrane bioreactors for municipal wastewater treatment," MBR2: Membr. Bioreact. Wastewater Treat., 2nd Intl. Meeting; School of Water Sciences, Cranfield University, Cranfield, UK, Jun. 1999.
Johnson, "Recent Advances in Microfiltration for Drinking Water Treatment," AWWA Annual Conference, Jun. 20-24, 1999, Chicago, Illinois, entire publication.
Jones, Craig, "Applications of Hydrogen Peroxide and Derivatives," The Royal Society of Chemistry, Cambridge, UK 1999 Chapters 2 and 5.
Kaiya et al., "Water Purification Using Hollow Fiber Microfiltration Membranes," 6th World Filtration Congress, Nagoya, 1993, pp. 813-816.
Kang et al. "Characteristics of microfiltration membranes in a membrane coupled sequencing batch reactor system" Water Research, Elsevier, Amsterdam, NL, vol. 37, No. 5, Mar. 2003.
Lloyd, D.R. et al. "Microporous Membrane Formation Via Thermally Induced Phase Separation/Solid-Liquid Phase Separation" Journal of Membrane Science (Sep. 15, 1990), pp. 239-261, vol. 52, No. 3, Elsevier Scientific Publishing Company, Amsterdam, NL.
Lozier et al., "Demonstration Testing of ZenoGem and Reverse Osmosis for Indirect Potable Reuse Final Technical Report," published by CH2M Hill, available from the National Technical Information Service, Operations Division, Jan. 2000, entire publication.
Mark et al., "Peroxides and Peroxy Compounds, Inorganic" Kirk—Othmer Encyclopedia of Chemical Technology, Peroxides and Peroxy Compounds, Inorganic, To Piping Systems, New York, Wiley & Sons, Ed., Jan. 1, 1978, pp. 14-18.
MicroCTM—Carbon Source for Wastewater Denitrification. Information from Environmental Operating Solutions website including MSDS.
Nakayama, "Introduction to Fluid Mechanics," Butterworth-Heinemann, Oxford, UK, 2000.
Ramaswammy S. et al. "Fabrication of Ply (ECTFE) Membranes via thermally induced phase Separation", Journal of Membrane Science, (Dec. 1, 2002), pp. 175-180, vol. 210 No. 1, Scientific Publishing Company, Amsterdam, NL.
Rosenberger et al., Desalination, 151 (2002), pp. 195-200.
U.S. Appl. No. 60/278,007, filed Mar. 23, 2001.
Ueda et al., "Effects of Aeration on Suction Pressure in a Submerged Membrane Bioreactor," Wat. Res. vol. 31, No. 3, 1997, pp. 489-494.
Water Encyclopedia, edited by Jay Lehr, published by John Wiley & Sons, Inc., Hoboken, New Jersey, 2005. Available at http://wwwm-mrw.interscience.wiley.com/eow/.
Webster's Ninth New Collegiate Dictionary, Merriam-Webster Inc., Publishers, Springfield, Massachusetts, USA, Copyright 1986, p. 1298.
White et al., The Chemical Engineering Journal, 52 (1993), pp. 73-77.
Wikipedia, "Seawater," available at http://en.wikipedia.org/wiki/Seawater, Jul. 15, 2007.
Yamamoto et al., Water Science Technology, vol. 2, pp. 43-54; 1989.
Yoon: "Important operational parameters of membrane bioreactor-sludge disintegration (MBR-SD) system for zero excess sludge production" Water Research, Elsevier, Amsterdam, NL, vol. 37, No. 8, Apr. 2003.
Zenon, "Proposal for ZeeWeed® Membrane Filtration Equipment System for the City of Westminster, Colorado, Proposal No. 479-99," Mar. 2000, entire publication.
Australian First Examiner's Report dated Apr. 26, 2012 for Application No. 2011253685.
Canadian Office Action dated Mar. 23, 2012 for Application No. 2,688,455, 3 pages.
Canadian Office Action dated May 17, 2011 for Application No. 2,688,455, 4 pages.
Cui et al., "Airlift crossflow membrane filtration-a feasibility study with dextran ultrafiltration," J. Membrane Sci. (1997) vol. 128, pp. 83-91.
European Search Report dated Apr. 20, 2012 for Application No. 12158848.7.
Japanese Office Action dated Apr. 26, 2011 for Application No. 2010-510337.
Korean Notice to File a Response dated Dec. 28, 2011 for Application No. 10-2009-7027311 (Translation provided).
New Zealand Examination Report dated May 2, 2011 for Application No. 581008.
Notification of Transmittal of the International Preliminary Report on Patentability dated Sep. 2, 2009 for Application No. PCT/US20081006799.
Written Opinion of the International Preliminary Examining Authority dated Jul. 30, 2009 for Application No. PCT/ US2008/006799.
Written Opinion of the International Preliminary Examining Authority dated May 5, 2009 for Application No. PCT/US2008/006799.

* cited by examiner

MEMBRANE CLEANING WITH PULSED AIRLIFT PUMP

CROSS REFERENCE TO RELATED APPLICATIONS

This application is a continuation application of U.S. application Ser. No. 12/895,156 filed on Sep. 30, 2010, titled MEMBRANE CLEANING WITH PULSED AIRLIFT PUMP, which is a continuation application of U.S. application Ser. No. 12/602,316 filed on Nov. 30, 2009, titled MEMBRANE CLEANING WITH PULSED AIRLIFT PUMP, which is a U.S. national stage application and claims the benefit under 35 U.S.C. §371 of International Application No. PCT/US2008/006799 filed on May 29, 2008, titled MEMBRANE CLEANING WITH PULSED AIRLIFT PUMP, which claims priority under 35 U.S.C. §119(e) to U.S. Provisional Application Ser. No. 60/940,507, titled MEMBRANE CLEANING WITH PULSED AIRLIFT PUMP, filed on May 29, 2007, each of which is herein incorporated by reference in their entirety for all purposes and to which this application claims the benefit of priority.

TECHNICAL FIELD

The present invention relates to membrane filtration systems and, more particularly, to apparatus and related methods to effectively clean the membranes used in such systems by means of pulsed fluid flow.

BACKGROUND OF THE INVENTION

The importance of membranes for treatment of wastewater is growing rapidly. It is now well known that membrane processes can be used as an effective tertiary treatment of sewage and provide quality effluent. However, the capital and operating cost can be prohibitive. With the arrival of submerged membrane processes where the membrane modules are immersed in a large feed tank and filtrate is collected through suction applied to the filtrate side of the membrane or through gravity feed, membrane bioreactors combining biological and physical processes in one stage promise to be more compact, efficient and economic. Due to their versatility, the size of membrane bioreactors can range from household (such as septic tank systems) to the community and large-scale sewage treatment.

The success of a membrane filtration process largely depends on employing an effective and efficient membrane cleaning method. Commonly used physical cleaning methods include backwash (backpulse, backflush) using a liquid permeate or a gas or combination thereof, membrane surface scrubbing or scouring using a gas in the form of bubbles in a liquid. Typically, in gas scouring systems, a gas is injected, usually by means of a blower, into a liquid system where a membrane module is submerged to form gas bubbles. The bubbles so formed then travel upwards to scrub the membrane surface to remove the fouling substances formed on the membrane surface. The shear force produced largely relies on the initial gas bubble velocity, bubble size and the resultant of forces applied to the bubbles. To enhance the scrubbing effect, more gas has to be supplied. However, this method consumes large amounts of energy. Moreover, in an environment of high concentration of solids, the gas distribution system may gradually become blocked by dehydrated solids or simply be blocked when the gas flow accidentally ceases.

Furthermore, in an environment of high concentration of solids, the solid concentration polarisation near the membrane surface becomes significant during filtration where clean filtrate passes through membrane and a higher solid-content retentate is left, leading to an increased membrane resistance. Some of these problems have been addressed by the use of two-phase flow to clean the membrane.

Cyclic aeration systems which provide gas bubbles on a cyclic basis are claimed to reduce energy consumption while still providing sufficient gas to effectively scrub the membrane surfaces. In order to provide for such cyclic operation, such systems normally require complex valve arrangements and control devices which tend to increase initial system cost and ongoing maintenance costs of the complex valve and switching arrangements required. Cyclic frequency is also limited by mechanical valve functioning in large systems. Moreover, cyclic aeration has been found to not effectively refresh the membrane surface.

It would be desirable to provide an energy efficient operation of the scouring process without the need to control the operation by means of complex valve switching etc. It is also preferable to provide a two-phase liquid gas flow past the membrane surfaces to provide a more effective scouring process while minimizing energy requirements for such a cleaning process.

DISCLOSURE OF THE INVENTION

The present invention, at least in its embodiments, seeks to overcome or least ameliorate some of the disadvantages of the prior art or at least provide the public with a useful alternative.

According to one aspect, the present invention provides a method of cleaning a membrane surface immersed in a liquid medium with a fluid flow, including the steps of providing a randomly generated intermittent or pulsed fluid flow along said membrane surface to dislodge fouling materials therefrom and reduce the solid concentration polarisation. For preference, the fluid flow includes a gas flow. Preferably, the gas flow is in the form of gas bubbles. For further preference, the fluid flow includes a two phase gas/liquid flow. Preferably, the method includes producing the pulsed two-phase gas/liquid flow using a device supplied with a flow of pressurized gas. For further preference, the supply of pressurised gas flow is essentially constant. Preferably, the pulsed fluid flow is random in magnitude and/or frequency and/or duration.

In one form of the invention, the pulsed two-phase gas/liquid flow is used in conjunction with an essentially constant two-phase gas/liquid flow.

Optionally, an additional source of bubbles may be provided in said liquid medium by means of a blower or like device. The gas used may include air, oxygen, gaseous chlorine, ozone, nitrogen, methane or any other gas suitable for a particular application. Air is the most economical for the purposes of scrubbing and/or aeration. Gaseous chlorine may be used for scrubbing, disinfection and enhancing the cleaning efficiency by chemical reaction at the membrane surface. The use of ozone, besides the similar effects mentioned for gaseous chlorine, has additional features, such as oxidizing DBP precursors and converting non-biodegradable NOM's to biodegradable dissolved organic carbon. In some applications, for example, an anaerobic biological environment or a non-biological environment where oxygen or oxidants are undesirable, nitrogen may be used, particularly where the feed tank is closed with ability to capture and recycle the nitrogen.

According to a second aspect, the present invention provides a membrane module comprising a plurality of porous membranes or a set of membrane modules and means for providing a randomly generated, pulsed fluid flow such that, in use, said fluid flow moves past the surfaces of said membranes to dislodge fouling materials therefrom. For preference, the fluid flow includes a gas flow which generates bubbles which move past the surfaces of said membranes. For further preference, the fluid flow includes a two phase gas/liquid flow. Preferably, said pulsed two-phase gas/liquid flow is produced by a device provided with an essentially constant supply of gas. Preferably, the pulsed fluid flow is random in magnitude and/or frequency and/or duration.

Where a set of membrane modules are used, the modules are generally assembled in an array, rack or a cassette located in a feed containing vessel or tank. To clean a rack or a cassette of membrane modules, the device for providing the pulsed gas or two-phase gas/liquid flow can be connected to a distributor and the pulsed gas bubbles generated are distributed into the modules through the distributor. It is preferred to arrange one device to one module or to a small number of modules. Accordingly, there typically are a number of devices installed for one rack or cassette. Gas is preferably supplied to the rack and then distributed to each device along the rack manifold. Although the gas is supplied to individual device in a continuous mode, the eruption of gas bubbles from the devices along the rack is produced at random times, keeping the membrane tank feed essentially constantly in an unstable condition. This effect reduces solid concentration polarisation and hence the filtration resistance. When looking down from the top of a rack, gas bubbles appear randomly from different modules within the rack, forming a random distribution pattern.

Even where the gas supply to the rack is continuous and at the same flow rate, the volumetric gas flow to an individual module generally fluctuates in a small range, generally in less than 15%. This is due to the variation in back pressure inside the pulsed gas-lift device.

For preference, the membranes comprise porous hollow fibers, the fibers being fixed at each end in a header, the lower header having one or more holes formed therein through which the two-phase gas/liquid flow is introduced. The holes can be circular, elliptical or in the form of a slot. The fibers are normally sealed at one end (usually, the lower end) and open at their other end to allow removal of filtrate, however, in some arrangements, the fibers may be open at both ends to allow removal of filtrate from one or both ends. The sealed ends of the fibers may be potted in a potting head or may be left unpotted. The fibers are preferably arranged in mats, cylindrical arrays or bundles. It will be appreciated that the cleaning process described is equally applicable to other forms of membrane such flat or plate membranes.

For further preference, the membranes comprise porous hollow fibers, the fibers being fixed at each end in a header to form a sub-module. A set of sub-modules are assembled to form a module. Between sub-modules, one or more holes are left to allow the passage or distribution of gas/liquid into the sub-modules.

According to one preferred form, the present invention provides a method of removing fouling materials from the surface of a plurality of porous hollow fiber membranes mounted and extending longitudinally in an array to form a membrane module, said membranes being arranged in close proximity to one another and mounted to prevent excessive movement therebetween, the method comprising the steps of providing a generally random, uniformly distributed pulsed gas bubble flow past the surfaces of said membranes, said distribution being such that said bubbles flow substantially uniformly between each membrane in said array to scour the surface of said membranes and remove accumulated solids from within the membrane module.

For preference, gas bubble flow further includes a two phase gas/liquid flow. Preferably, said pulsed two-phase gas/liquid flow is produced by a device provided with an essentially constant supply of gas. Preferably, the pulsed gas flow is random in magnitude and/or frequency and/or duration.

According to a third aspect the present invention provides a membrane module comprising a plurality of porous hollow fiber membranes, said fiber membranes being arranged in close proximity to one another and mounted to prevent excessive movement therebetween, the fiber membranes being fixed at each end in a header, one header having one or more openings formed therein through which a generally random pulsed fluid flow is introduced for cleaning the surfaces of said hollow fiber membranes.

For preference, the fluid flow includes a gas flow. For further preference, the gas flow is in the form of gas bubbles. For preference, gas flow includes a two phase gas/liquid flow. Preferably, said pulsed two-phase gas/liquid flow is produced by a device provided with an essentially constant supply of gas. Preferably, the pulsed fluid flow is random in magnitude and/or frequency and/or duration.

Preferably, the device includes a gaslift pump apparatus operative in response to said essentially constant supply of pressurized gas from a gas source connected thereto to store and randomly release pressurized gas and use the released pressurized gas to gaslift quantities of said liquid from a reservoir of liquid to produce said pulsed two-phase gas/liquid flow.

For preference, said gaslift pump apparatus includes an inverted gas storage chamber for storing said gas provided by said gas source and having a closed upper end and an open lower end positioned in said reservoir of liquid, a vertical riser tube having an inlet port in fluid communication with said reservoir of liquid and an outlet port in fluid communication with said membrane module, said riser tube having an opening in fluid communication with said gas storage chamber positioned for receiving said stored gas from said chamber when the level of gas within the chamber reaches a predetermined level and gaslifting the liquid through said riser tube for discharge into said module. Preferably, the vertical riser tube is located within the gas storage chamber.

In one embodiment of the invention, the supply of gas may be provided by an external tank containing pressurised gas, the tank being in fluid communication with the membrane module and having control means for providing randomly generated pulses of gas to the module to form said two phase gas/liquid flow for cleaning the membrane surfaces. In one embodiment, the control means may comprise a device positioned in a gas/liquid inlet to the membrane module and operable in dependence on the level of liquid in the inlet to provide gas from the external tank. For example, a float device could be used to activate the control means depending on the liquid level.

Preferably, the fibers may be protected and fiber movement is limited by a module support screen which has both vertical and horizontal elements appropriately spaced to provide unrestricted fluid and gas flow through the fibers and to restrict the amplitude of fiber motion reducing energy concentration at the potted ends of the fibers. For preference, the module may be encapsulated in a substantially solid or liquid/gas impervious tube and connected to the pulsed gas-lift pump device so as to retain the two-phase gas/liquid flow within the module.

For preference, said openings comprise a slot, slots or a row of holes. Preferably, the fiber bundles are located in the potting head between the slots or rows of holes.

The liquid used may be the feed to the membrane module.

For preference, the pulse frequency of the randomly generated pulses varies in a range of generally from 0.1 to 200 seconds. It will be appreciated the pulse frequency is related to the structure of the device and with a particular structure, the pulse frequency preferably varies in a range of about 10 to about 300%.

Preferably, the pulsed gas-lift pump device can be optionally connected in fluid communication with a fluid distributor to substantially uniformly distribute the pulsed gas bubbles into the filtration module or modules.

Preferably, the fibers within the module have a packing density (as defined above) of between about 5 to about 80% and, more preferably, between about 8 to about 55%.

For preference, said holes have a diameter in the range of about 1 to 40 mm and more preferably in the range of about 1.5 to about 25 mm. In the case of a slot or row of holes, the open area is chosen to be equivalent to that of the above holes.

Typically, the fiber inner diameter ranges from about 0.1 mm to about 5 mm and is preferably in the range of about 0.25 mm to about 2 mm. The fibers wall thickness is dependent on materials used and strength required versus filtration efficiency. Typically wall thickness is between 0.05 to 2 mm and more often between 0.1 mm to 1 mm.

According to another aspect, the present invention provides a membrane bioreactor including a tank having means for the introduction of feed thereto, means for forming activated sludge within said tank, a membrane module according to the third aspect positioned within said tank so as to be immersed in said sludge and said membrane module provided with means for withdrawing filtrate from at least one end of said membranes.

According to yet another aspect, the present invention provides a method of operating a membrane bioreactor of the type described in the above aspect comprising introducing feed to said tank, applying a vacuum to said fibers to withdraw filtrate therefrom while providing said pulsed gas flow through aeration openings within said module such that, in use, said gas flow moves past the surfaces of said membrane fibers to dislodge fouling materials therefrom.

If required, a further source of aeration may be provided within the tank to assist microorganism activity. For preference, the membrane module is suspended vertically within the tank and said further source of aeration may be provided beneath the suspended module. Preferably, the further source of aeration comprises a group of air permeable tubes. The membrane module may be operated with or without backwash depending on the flux and feed condition. A high mixed liquor of suspended solids (5,000 to 20,000 ppm) in the bioreactor has been shown to significantly reduce residence time and improve filtrate quality. The combined use of aeration for both degradation of organic substances and membrane cleaning has been shown to enable constant filtrate flow without significant increases in transmembrane pressure while establishing high concentration of MLSS.

According to another aspect the present invention provides a water treatment system including a tank; a liquid chamber fluidly connected to the tank; a gas chamber fluidly connected to the liquid chamber; and a membrane module fluidly connected to the gas chamber.

Preferably the water treatment system includes a gas transfer system having a suction side connected to the liquid chamber and a discharge side connected to the gas chamber. For preference, a source of gas fluidly is connected to the liquid chamber. Preferably the system includes a membrane module vessel containing the membrane module and the membrane module vessel is hydraulically connected to the tank.

According to another aspect the invention provides a water treatment system comprising a liquid reservoir fluidly connected to a source of water; a gas/liquid chamber enclosing a first compartment and a second compartment, the first compartment fluidly connected to the liquid reservoir; and a membrane separation vessel hydraulically connected to the second compartment.

For preference, the system includes a chamber hydraulically isolated from the membrane module and a gas source connected to the chamber.

Preferably the membrane module is immersed in a solid-containing liquid feed contained in a membrane tank, the membrane tank is hydraulically connected to the aeration zone which is fluidly connected to the chamber.

According to another aspect the present invention provides a method of scouring a membrane module including: providing a chamber having a first compartment and a second compartment; establishing a hydraulic seal between the first compartment and the membrane module; at least partially filling the first compartment with a liquid feed and introducing a gas into the chamber.

Preferably, the method includes breaking the hydraulic seal, wherein breaking the hydraulic seal releases at least a portion of the gas contained in the chamber to the membrane module and then re-establishing the hydraulic seal between the first compartment and the membrane module.

For preference, the method includes re-breaking and re-establishing the hydraulic seal to produce a pulsed release of at least a portion of the gas contained in the chamber.

Preferably, the method includes introducing liquid feed into the second compartment. In one form of the method, introduction of the gas into the chamber is performed continuously.

According to another aspect, the present invention provides a method of cleaning filtration membranes located in a vessel containing liquid by providing generally random pulses of fluid within the liquid at a number of locations within the vessel. Preferably, the pulses of fluid are random in magnitude and/or frequency and/or duration. For preference, the fluid includes gas. For further preference, the gas is in the form of gas bubbles. For preference, fluid includes a two phase gas/liquid mixture. Preferably, said pulsed two-phase gas/liquid mixture is produced by a device provided with an essentially constant supply of gas.

BRIEF DESCRIPTION OF THE DRAWINGS

Preferred embodiments of the invention will now be described, by way of example only, with reference to the accompanying drawings in which.

DESCRIPTION OF PREFERRED EMBODIMENTS

Figure 1:
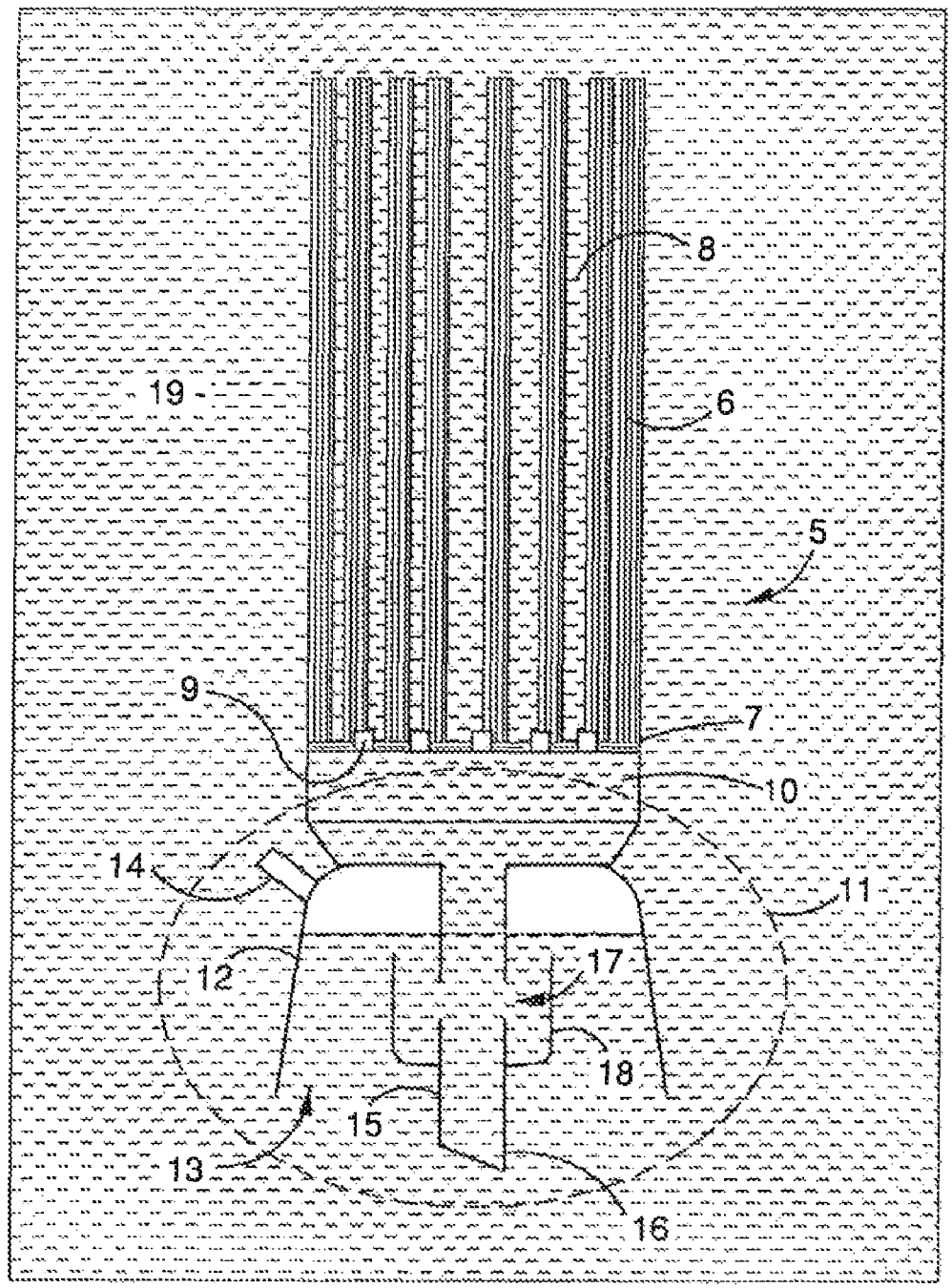
FIG. 1 is a simplified schematic cross-sectional elevation view of a membrane module according to one embodiment of the invention.
Figure 2:
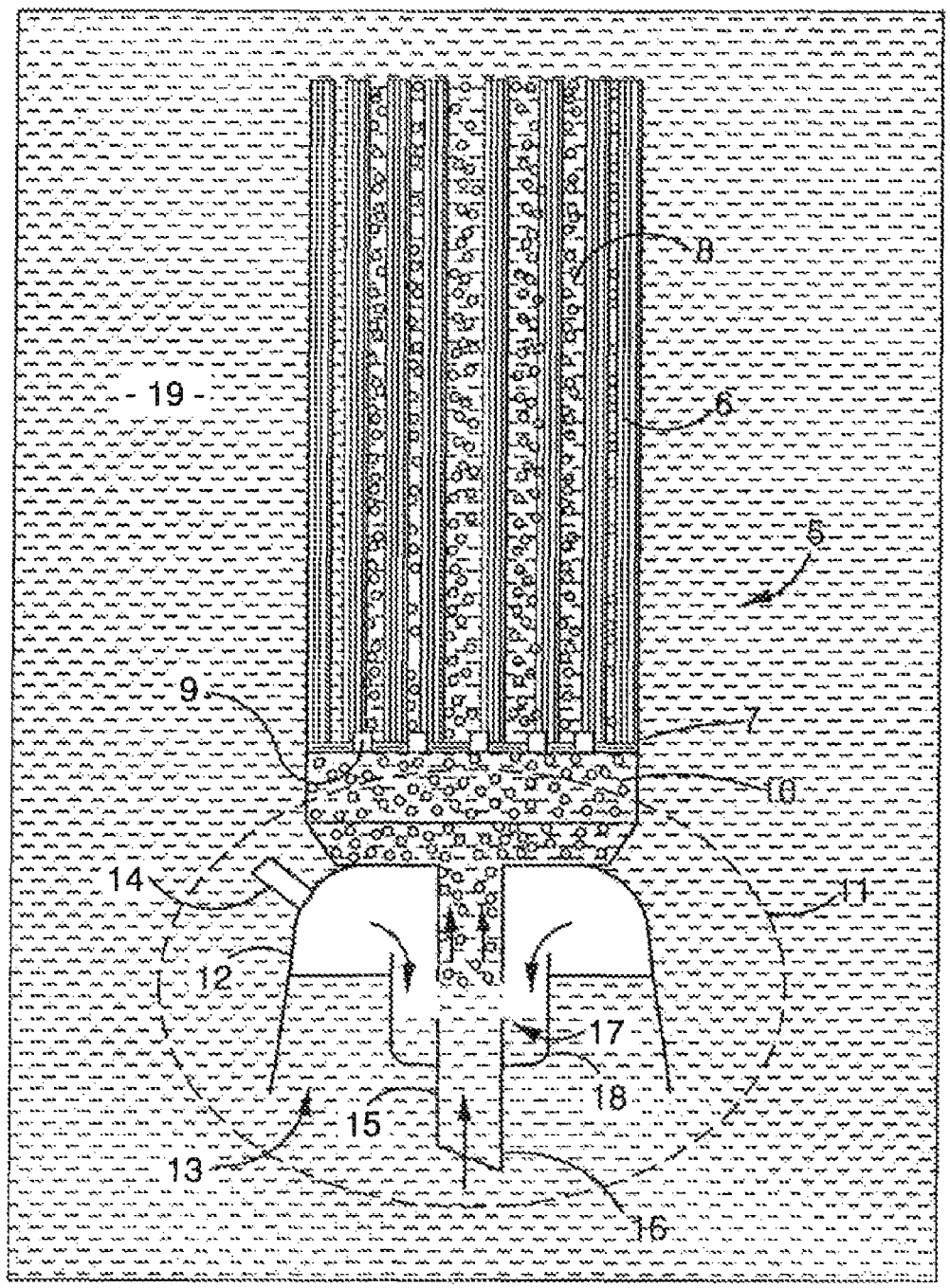
FIG. 2 shows the module of FIG. 1 during the pulse activation phase.
Figure 3:
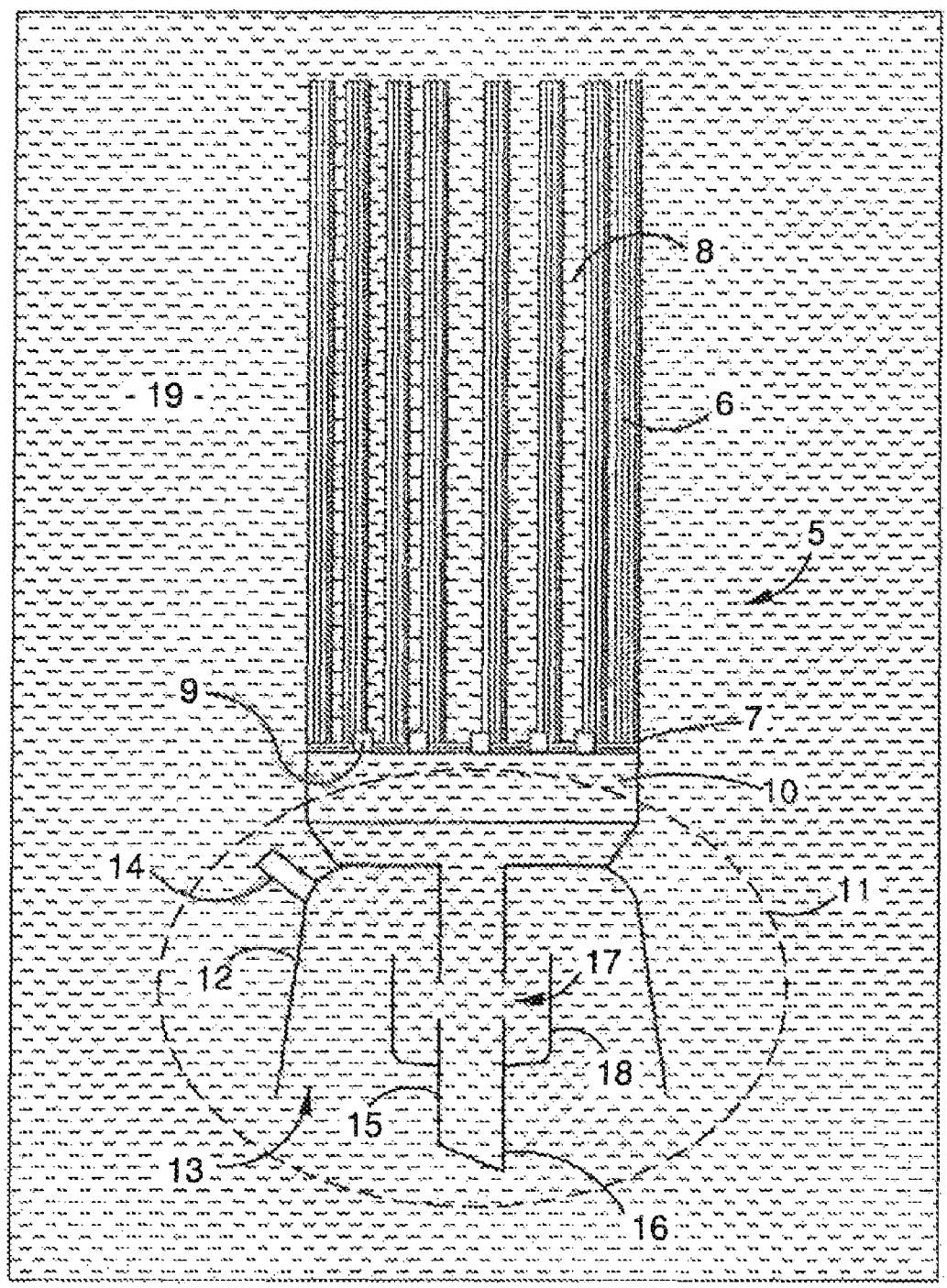
FIG. 3 shows the module of FIG. 1 following the completion of the pulsed two-phase gas/liquid flow phase.

Referring to the drawings, FIGS. 1 to 3 show a membrane module arrangement according to one embodiment of the invention.

The membrane module 5 includes a plurality of permeable hollow fiber membranes bundles 6 mounted in and extending from a lower potting head 7. In this embodiment, the bundles are partitioned to provide spaces 8 between the bundles 6. It will be appreciated that any desirable arrangement of membranes within the module 5 may be used. A number of openings 9 are provided in the lower potting head 7 to allow flow of fluids therethrough from the distribution chamber 10 positioned below the lower potting bead 7.

A pulsed gas-lift pump device 11 is provided below the distribution chamber 10 and in fluid communication therewith. The pulsed gas-lift pump device 11 includes an inverted gas collection chamber 12 open at its lower end 13 and having a gas inlet port 14 adjacent its upper end. A central riser tube 15 extends through the gas collection chamber 12 and is fluidly connected to the base of distribution chamber 10 and open at its lower end 16. The riser tube 15 is provided with an opening or openings 17 partway along its length. A tubular trough 18 extends around and upward from the riser tube 15 at a location below the openings 17.

In use, the module 5 is immersed in liquid feed 19 and source of pressurized gas is applied, essentially continuously, to gas inlet port 14. The gas gradually displaces the feed liquid 19 within the inverted gas collection chamber 12 until it reaches the level of the opening 17. At this point, as shown in FIG. 2, the gas breaks the liquid seal across the opening 17 and surges through the opening 17 and upward through the central riser tube 15 creating a pulse of gas bubbles and feed liquid which flows through the distribution chamber 10 and into the base of the membrane module 5. The rapid surge of gas also sucks liquid through the base opening 16 of the riser tube 15 resulting in a high velocity two-phase gas/liquid flow. The two-phase gas/liquid pulse then flows through the openings 9 to scour the surfaces of the membranes 6. The trough 18 prevents immediate resealing of the opening 17 and allows for a continuing flow of the gas/liquid mixture for a short period after the initial pulse.

The initial surge of gas provides two phases of liquid transfer, ejection and suction. The ejection phase occurs when the bubble slug is initially released into the riser tube 15 creating a strong buoyancy force which ejects gas and liquid rapidly through the riser tube 15 and subsequently through the membrane module 5 to produce an effective cleaning action on the membrane surfaces. The ejection phase is followed by a Suction or siphon phase where the rapid flow of gas out of the riser tube 15 creates a temporary reduction in pressure due to density difference which results in liquid being sucked through the bottom 16 of the riser tube 15. Accordingly, the initial rapid two phase gas/liquid flow is followed by reduced liquid flow which may also draw in further gas through opening 17.

The gas collection chamber 12 then refills with feed liquid, as shown in FIG. 3, and the process begins again resulting in another pulsing of two-phase gas/liquid cleaning of the membranes 6 within the module 5. Due to the relatively uncontrolled nature of the process, the pulses are generally random in frequency and duration.

Figure 4:
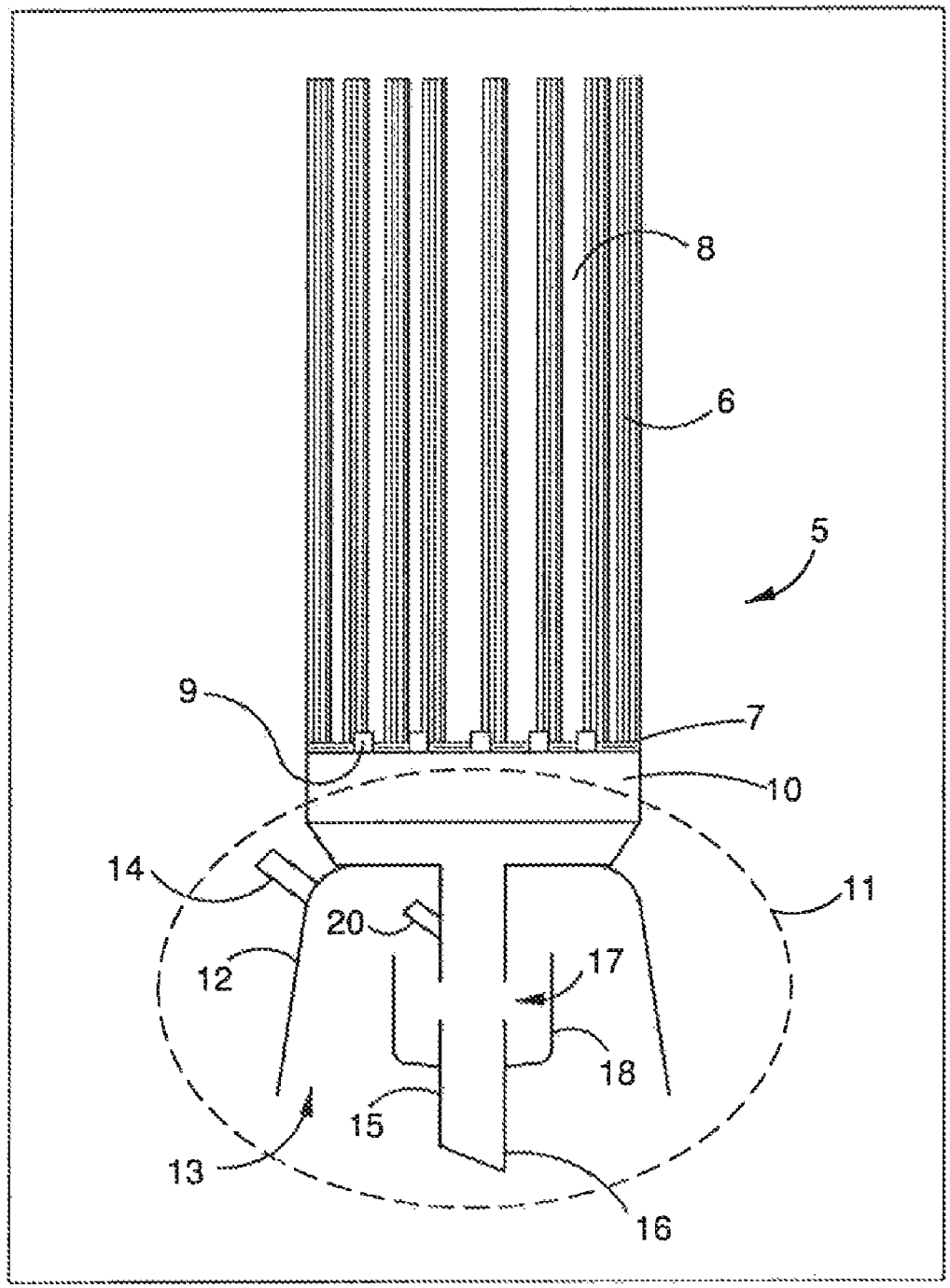
FIG. 4 is a simplified schematic cross-sectional elevation view of a membrane module according to second embodiment of the invention.

FIG. 4 shows a further modification of the embodiment of FIGS. 1 to 3. In this embodiment, a hybrid arrangement is provided where, in addition to the pulsed two-phase gas/liquid flow, a steady state supply of gas is fed to the upper or lower portion of the riser tube 15 at port 20 to generate a constant gas/liquid flow through the module 5 supplemented by the intermittent pulsed two-phase gas/liquid flow.

Figure 5:
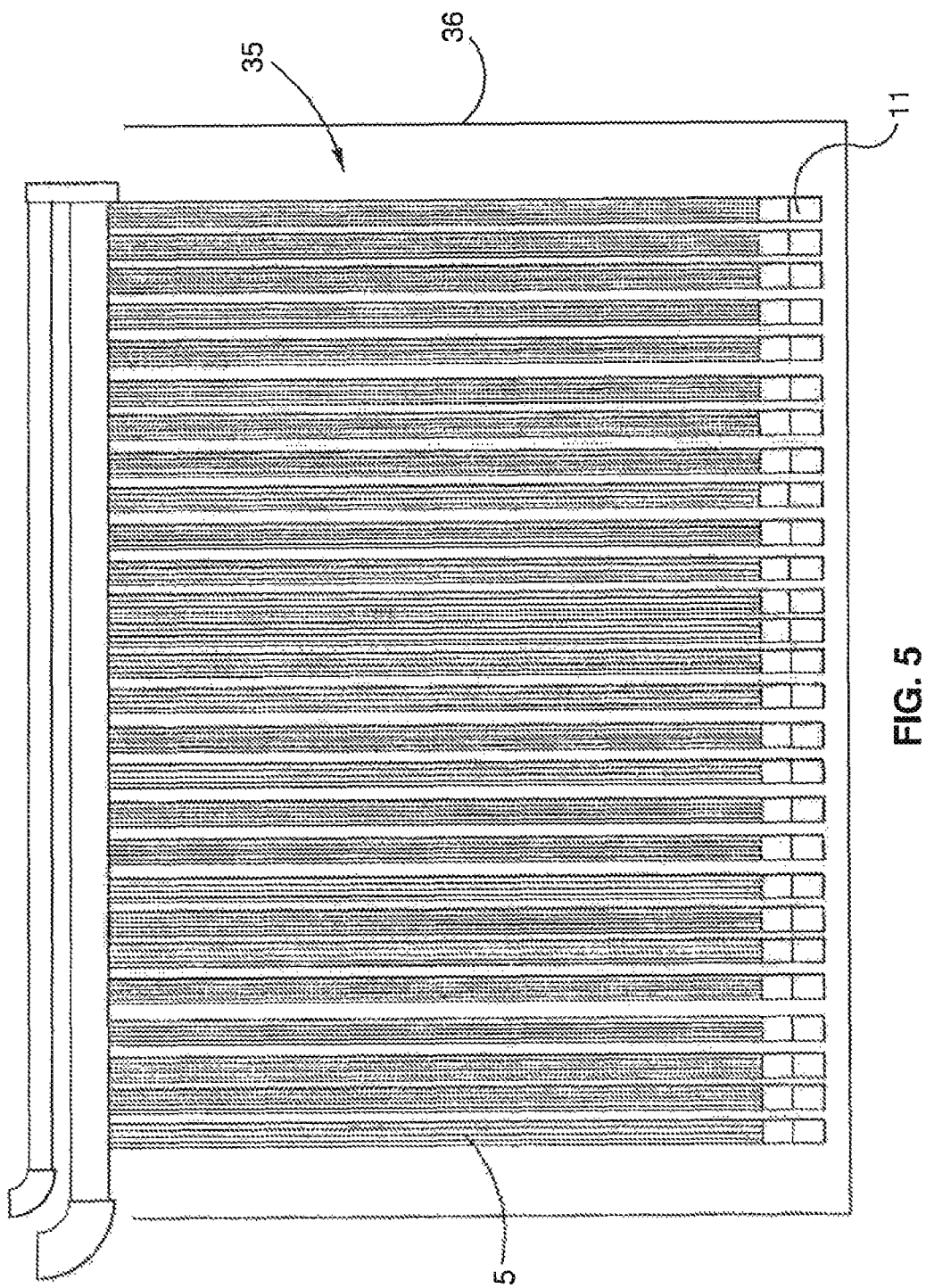
FIG. 5 is a simplified schematic cross-sectional elevation view of a water treatment system according to third embodiment of the invention.

FIG. 5 shows an array of modules 35 and pump devices 11 of the type described in relation to the embodiment of FIG. 1 to 3. The modules 5 are positioned in a feed tank 36. In operation, the pulses of gas bubbles produced by each pump device 11 occur randomly for each module 5 resulting in an overall random distribution of pulsed gas bubble generation within the feed tank 36. This produces a constant but randomly or chaotically varying agitation of liquid feed within the feed tank 36.

Figure 6:
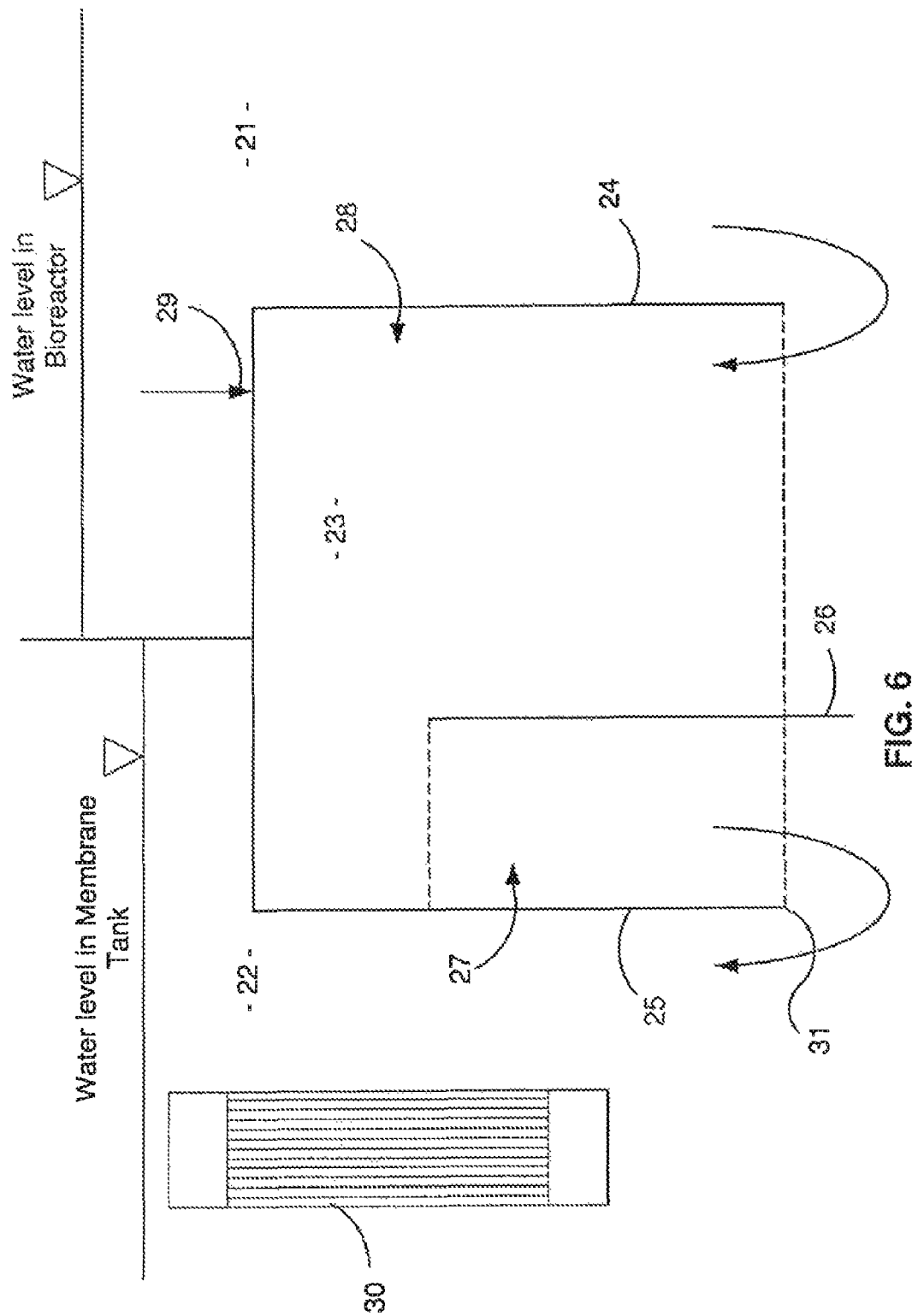
FIG. 6 a simplified schematic cross-sectional elevation view of an array of membrane modules of the type illustrated in the embodiment of FIG. 1.

FIG. 6 shows an arrangement for use of the invention in a water treatment system using a membrane bioreactor. In this embodiment the pulsed twophase gas liquid flow is provided between a bioreactor tank 21 and membrane tank 22. The tanks are coupled by an inverted gas collection chamber 23 having one vertically extending wall 24 positioned in the bioreactor tank 21 and a second vertically extending wall 25 positioned in the membrane tank 22. Wall 24 extends to a lower depth within the bioreactor tank 21 than does wall 25 within the membrane tank 22. The gas collection chamber 23 is partitioned by a connecting wall 26 between the bioreactor tank 21 and the membrane tank 22 define two compartments 27 and 28. Gas, typically air, is provided to the gas collection chamber 23 through port 29. A membrane filtration module or device 30 is located within the membrane tank 22 above the lower extremity of vertical wall 25.

In use, gas is provided under pressure to the gas collection chamber 23 through port 29 resulting in the level of water within the chamber 23 being lowered until it reaches the lower end 31 of wall 25. At this stage, the gas escapes rapidly past the wall 25 from compartment 27 and rises through the membrane tank 22 as gas bubbles producing a two-phase gas/liquid flow through the membrane module 30. The surge of gas also produces a rapid reduction of gas within compartment 28 of the gas collection chamber 23 resulting in further water being siphoned from the bioreactor tank 21 and into the membrane tank 22. The flow of gas through port 29 may be controlled by a valve (not shown) connected to a source of gas (not shown). The valve may be operated by a controller device (not shown).

It will be appreciated the pulsed flow generating cleaning device described in the embodiments above may be used with a variety of known membrane configurations and is not limited to the particular arrangements shown. The device may be directly connected to a membrane module or an assembly of modules. Gas, typically air, is continuously supplied to the device and a pulsed two-phase gas/liquid flow is generated for membrane cleaning and surface refreshment. The pulsed flow is generated through the device using a continuous supply of gas, however, it will be appreciated where a non-continuous supply of gas is used a pulsed flow may also be generated but with a different pattern of pulsing.

Figure 7A:
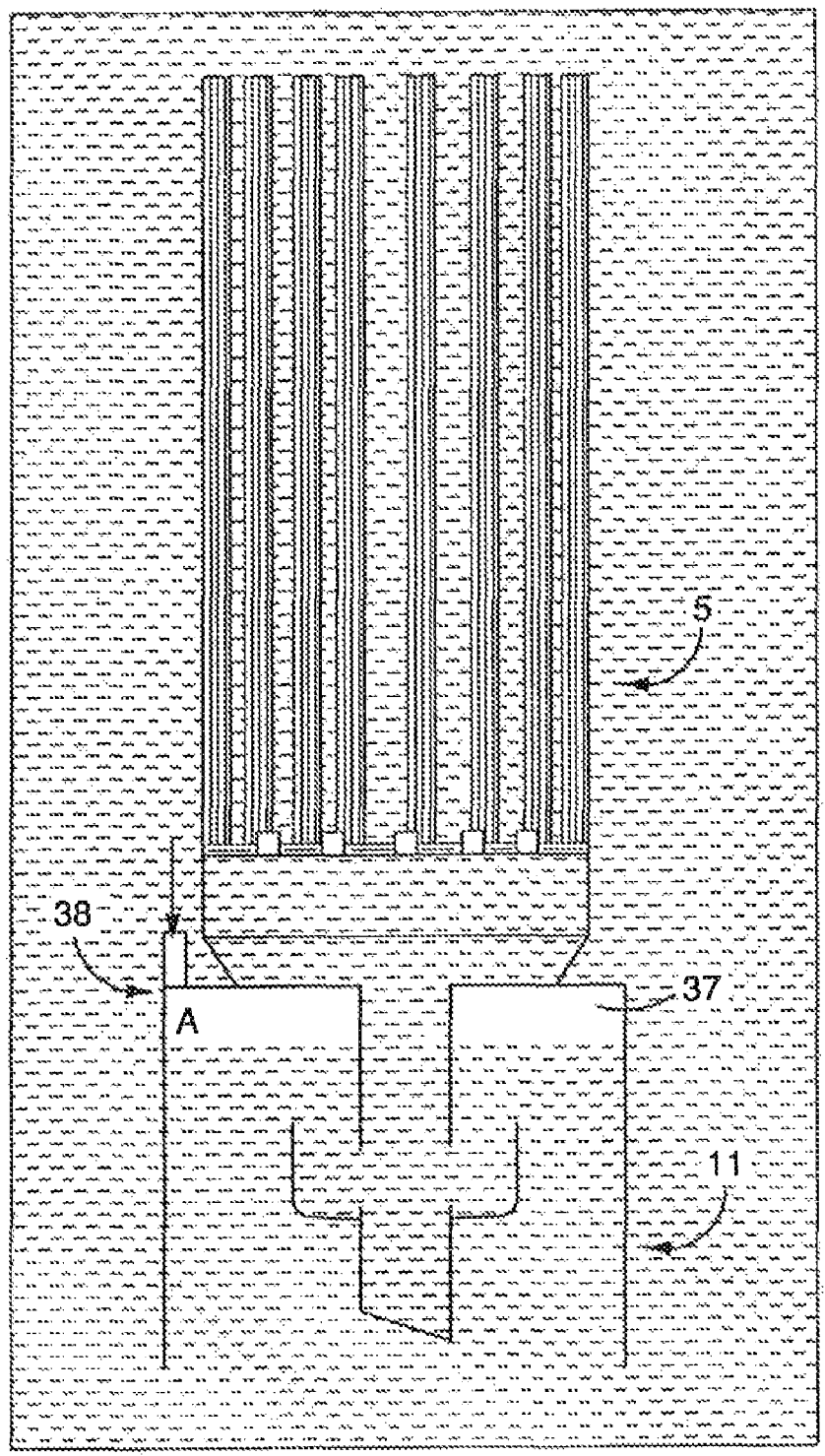
FIGS. 7A and 7B are a simplified schematic cross-sectional elevation views of a membrane module illustrating the operation levels of liquid within the pulsed gaslift device.
Figure 7B:
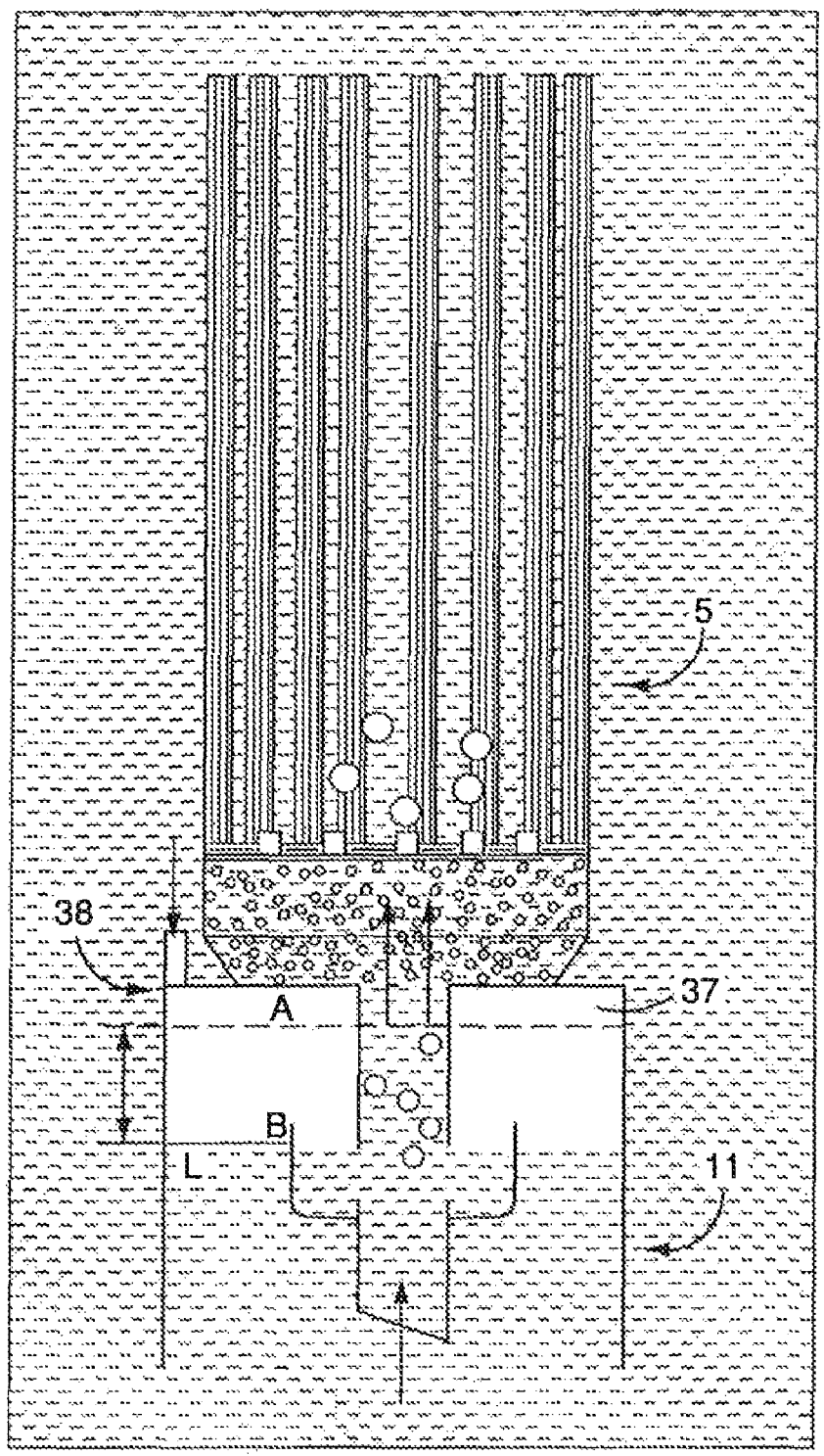
Figure 8:
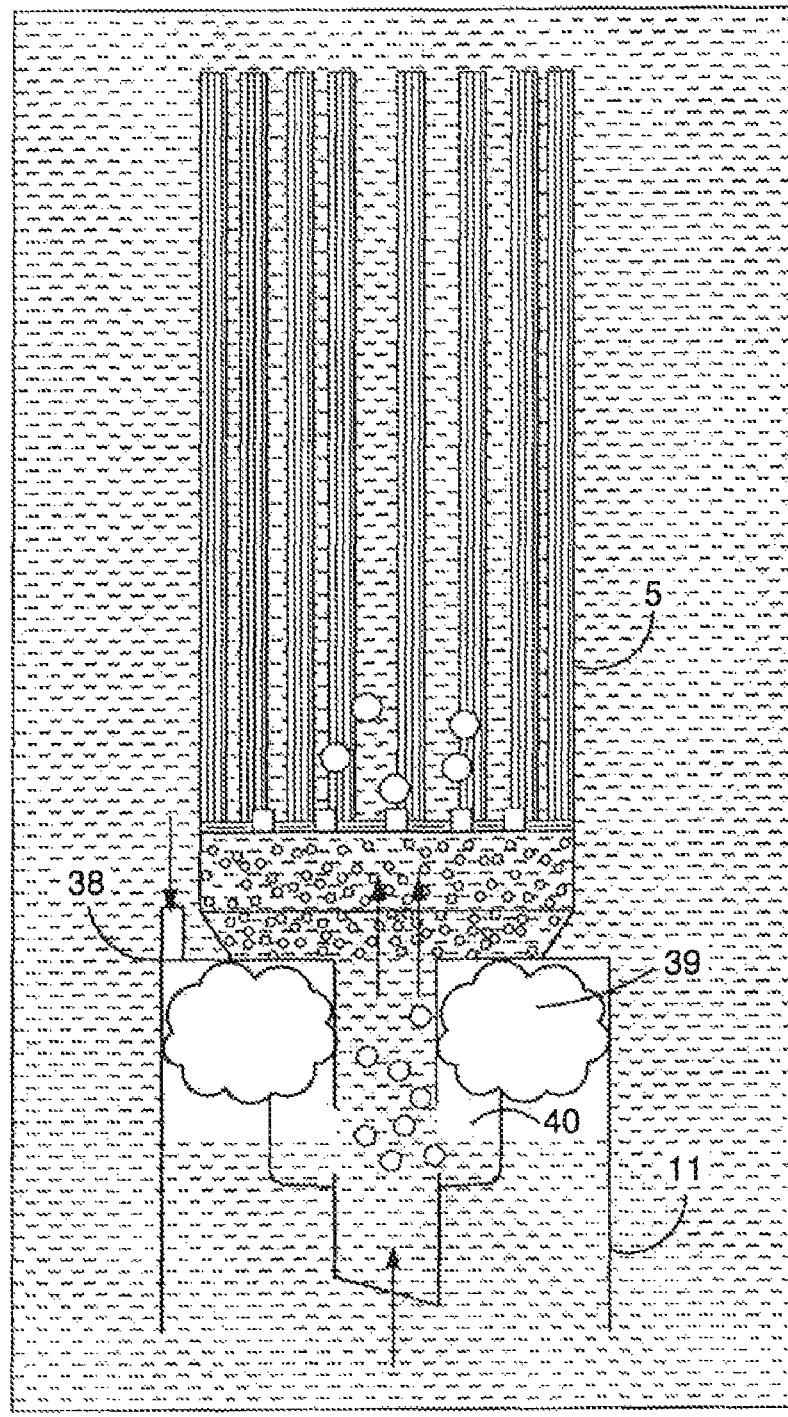
FIG. 8 is a simplified schematic cross-sectional elevation view of a membrane module of the type shown in the embodiment of FIG. 1, illustrating sludge build up in the pulse gaslift pump.

In some applications, it has been found the liquid level inside a pulsed gas-lift pump device 11 fluctuates between levels A and B as shown in FIGS. 7A and 7B. Near the top end inside the gas-lift pump device 11, there is typically left a space 37 that liquid phase cannot reach due to gas pocket formation. When such a pump device 11 is operated in high solid environment, such as in membrane bioreactors, scum and/or dehydrated sludge 39 may gradually accumulate in the space 37 at the top end of the pump device 11 and this eventually can lead to blockage of the gas flow channel 40, leading to a reduced pulsing or no pulsed effect at all. FIG. 8 illustrates such a scenario.

Figure 9:
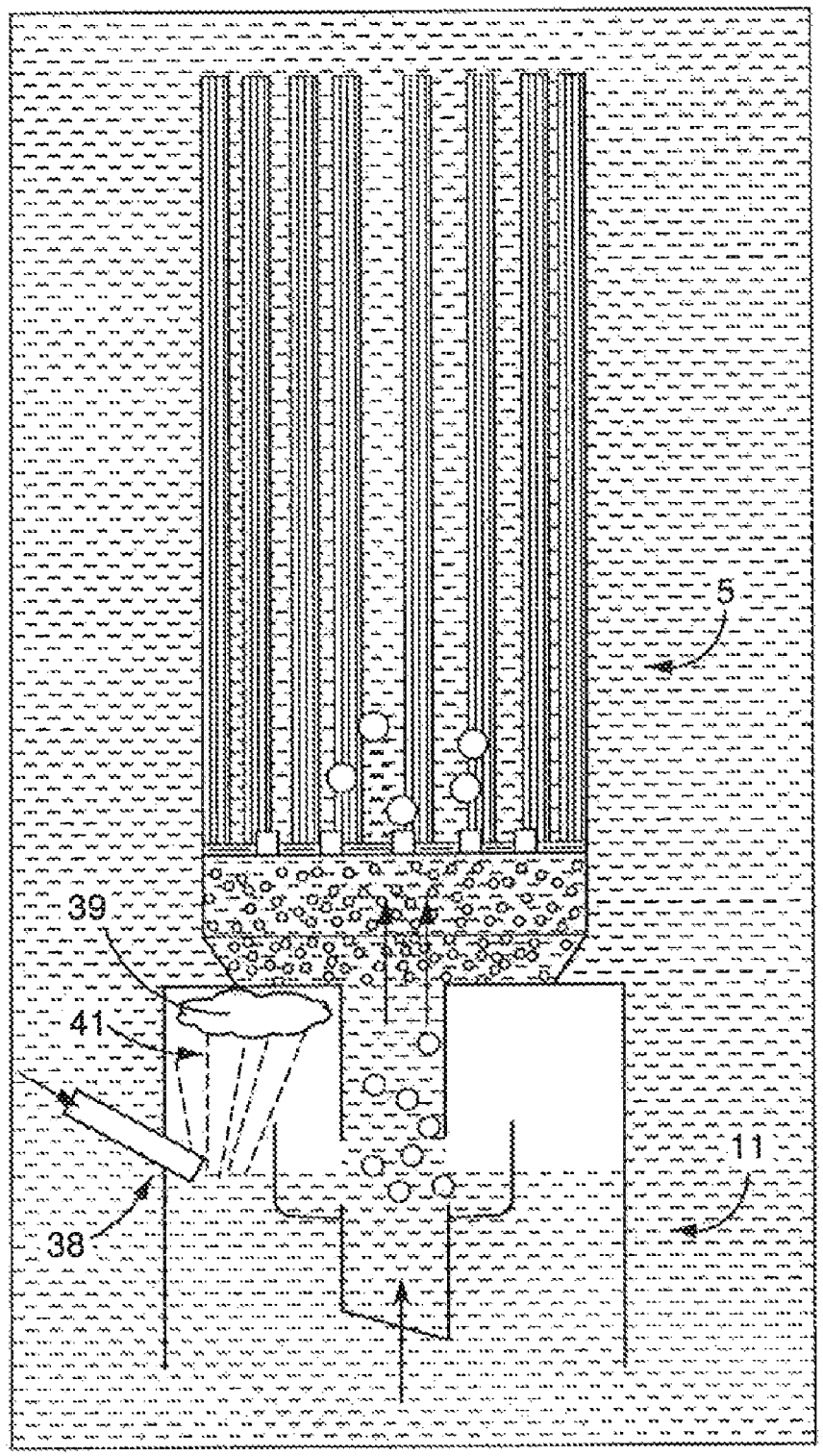
FIG. 9 a simplified schematic cross-sectional elevation view of a membrane module illustrating one embodiment of the sludge removal process.

Several methods to overcome this effect have been identified. One method is to locate the gas injection point 38 at a point below the upper liquid level reached during operation, level A in FIGS. 7A and 7B. When the liquid level reaches the gas injection point 38 and above, the gas generates a liquid spray 41 that breaks up possible scum or sludge accumulation near the top end of the pump device 11. FIG. 9 schematically shows such an action. The intensity of spray 41 is related to the gas injection location 38 and the velocity of gas. This method may prevent any long-term accumulation of sludge inside the pump device 11.

Another method is to periodically vent gas within the pump device 11 to allow the liquid level to reach the top end space 37 inside the pump device 11 during operation. In this case, the injection of gas must be at or near the highest point inside the pump device 11 so that all or nearly all the gas pocket 37 can be vented. The gas connection point 38 shown in FIG. 7 is an example. Depending on the sludge quality, the venting can be performed periodically at varying frequency to prevent the creation of any permanently dried environment inside the pump device.

It was also noted in operation of the pump device 11 that the liquid level A in FIG. 7 can vary according to the gas flowrate. The higher the gas flowrate, the less the gas pocket formation inside the pump device 11. Accordingly, another method which may be used is to periodically inject a much higher air flow into the pump device 11 during operation to break up dehydrated sludge. Depending on the design of the device, the gas flowrate required for this action is normally around 30% or more higher than the normal operating gas flowrate. This is possible in some plant operations by diverting gas from other membrane tanks to a selected tank to temporarily produce a short, much higher gas flow to break up dehydrated sludge. Alternatively, a standby blower (not shown) can be used periodically to supply more gas flow for a short duration.

The methods described above can be applied individually or in a combined mode to get a long term stable operation and to eliminate any scum/sludge accumulation inside the pump device 11.

Examples

Figure 10:
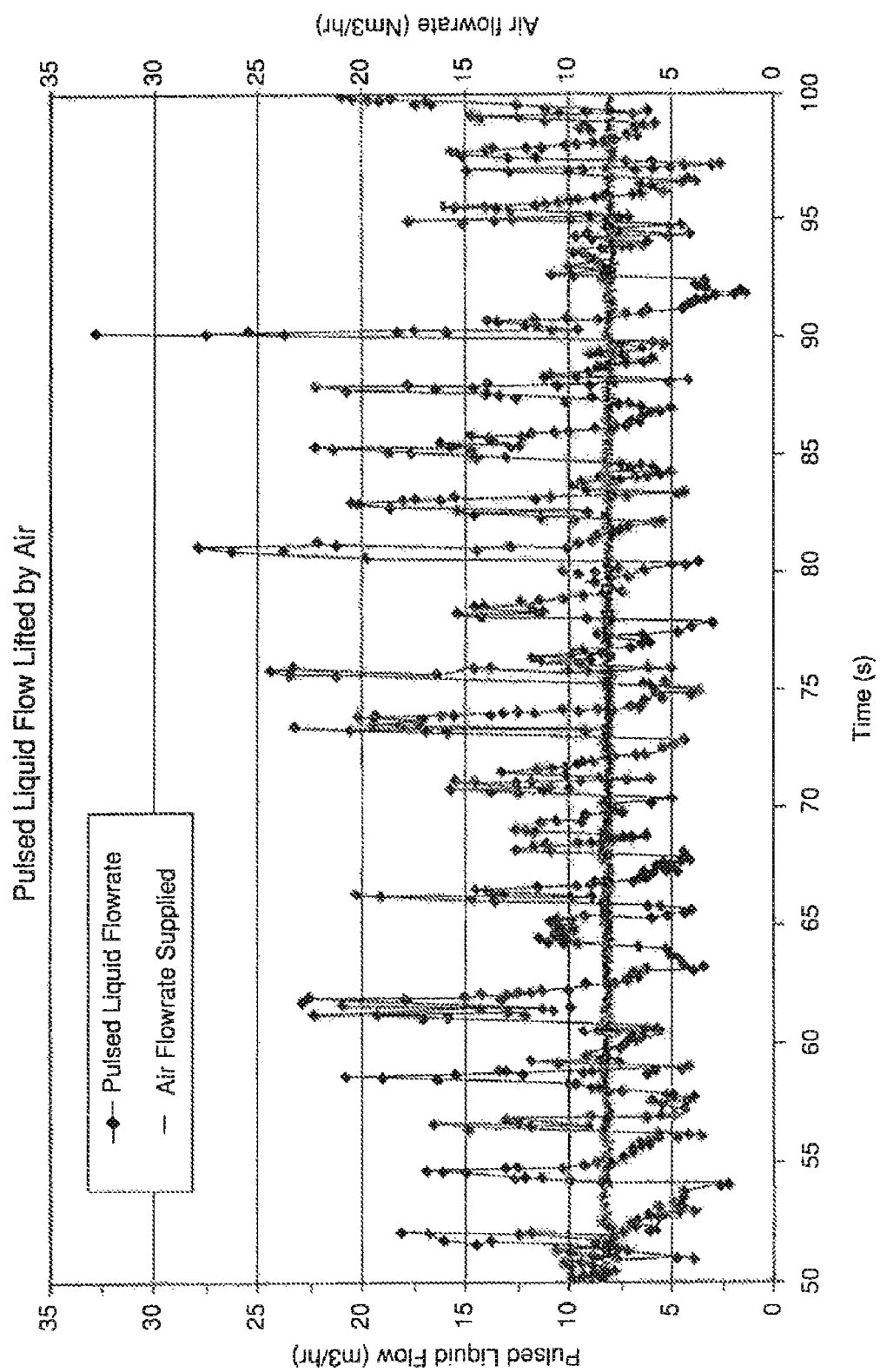
FIG. 10 is a graph of the pulsed liquid flow pattern and air flow rate supplied over time.

One typical membrane module is composed of hollow fiber membranes, has a total length of 1.6 m and a membrane surface area of 38 $m^2$. A pulsed flow generating device was connected to the typical membrane module. A paddle wheel flowmeter was located at the lower end of the riser tube to monitor the pulsed liquid flow-rate lifted by gas. FIG. 10 shows a snapshot of the pulsed liquid flow-rate at a constant supply of gas flow at 7.8 $Nm^3$/hr. The snapshot shows that the liquid flow entering the module had a random or chaotic pattern between highs and lows. The frequency from low to high liquid flow-rates was in the range of about 1 to 4.5 seconds. The actual gas flow-rate released to the module was not measured because it was mixed with liquid, but the flow pattern was expected to be similar to the liquid flow—ranging between highs and lows in a chaotic nature.

Figure 11:
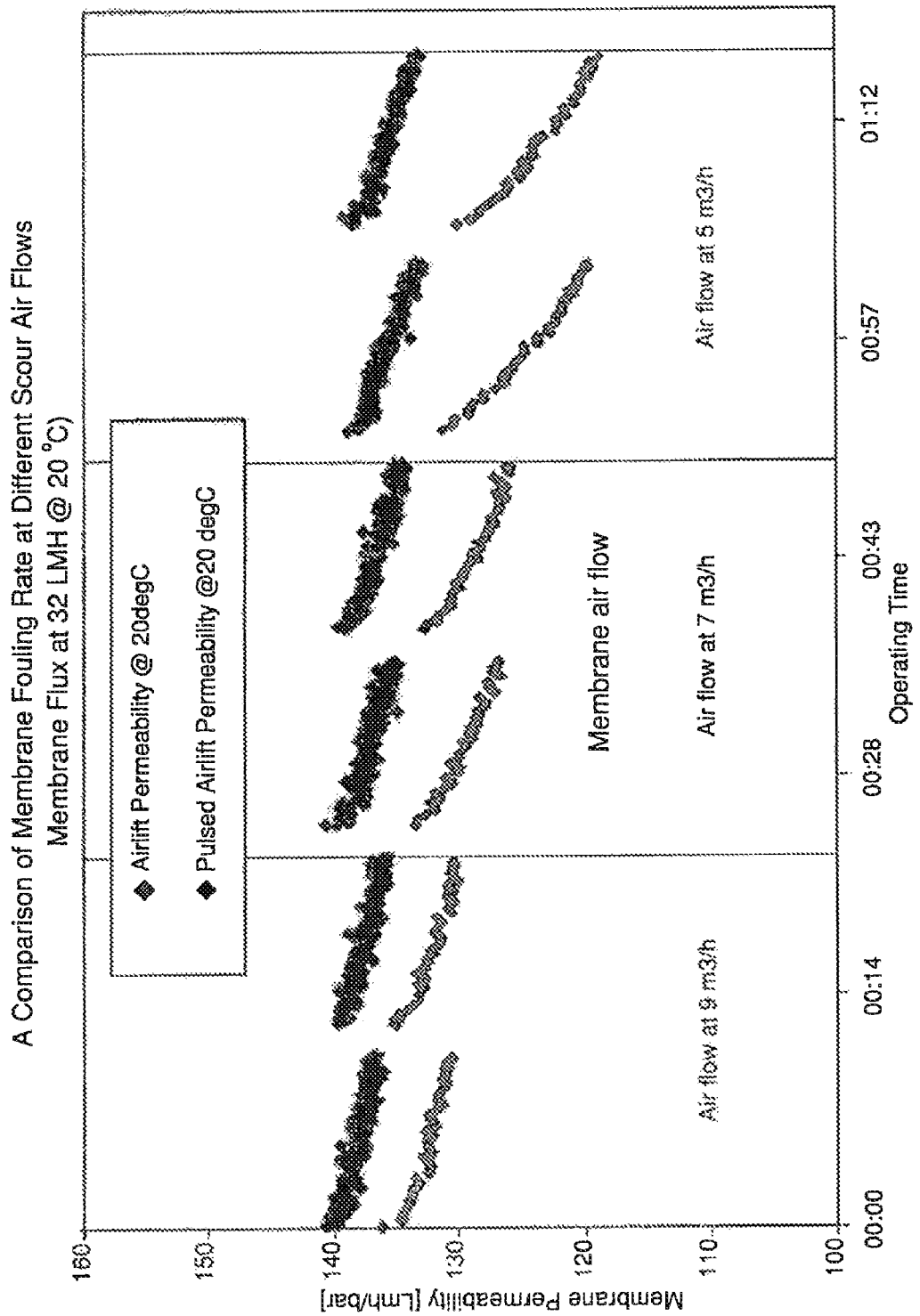
FIG. 11 is a graph of membrane permeability over time comparing cleaning efficiency using a gaslift device and a pulsed gaslift device according to the invention.

A comparison of membrane cleaning effect via pulsed and normal airlift devices was conducted in a membrane bioreactor. The membrane filtration cycle was 12 minutes filtration followed by 1 minute relaxation. At each of the air flow-rates, two repeated cycles were tested. The only difference between the two sets of tests was the device connected to the module—a normal gaslift device versus a pulsed gaslift device. The membrane cleaning efficiency was evaluated according to the permeability decline during the filtration. FIG. 11 shows the permeability profiles with the two different gaslift devices at different air flow-rates. It is apparent from these graphs that the membrane fouling rate is less with the pulsed gaslift pump because it provides more stable permeability over time than the normal gaslift pump.

A further comparison was performed between the performance of a typical cyclic aeration arrangement and the pulsed gas lift aeration of the present invention. The airflow rate was 3 $m^3$/h for the pulsed airlift, and 6 $m^3$/h for the cyclic aeration. Cyclic aeration periods of 10 s on/10 s off and 3 s on/3 s off were tested. The cyclic aeration of 10 s on/10 s off was chosen to mimic the actual operation of a large scale plant, with the fastest opening and closing of valves being 10 s. The cyclic aeration of 3 s on/3 s off was chosen to mimic a frequency in the range of the operation of the pulsed airlift device. The performance was tested at a normalised flux of approximately 30 LMH, and included long filtration cycles of 30 minutes.

Table 1 below summarizes the test results on both pulsed airlift operation and two different frequency cyclic aeration operations. The permeability drop during short filtration and long filtration cycles with pulsed airlift operation was much less significant compared to cyclic aeration operation. Although high frequency cyclic aeration improves the membrane performance slightly, the pulsed airlift operation maintained a much more stable membrane permeability, confirming a more effective cleaning process with the pulsed airlift arrangement.

TABLE 1

Effect of air scouring mode on membrane performance

| | Operation mode | | |
|---|---|---|---|
| | Pulsed airlift | 10 s on/10 s off cyclic aeration | 3 s on/3 s off cyclic aeration |
| Membrane permeability drop during 12 minute filtration | 1.4-2.2 lmh/bar | 3.3-6 lmh/bar | 3.6 lmh/bar |
| Membrane permeability drop during 30 minute filtration | 2.5-4.8 lmh/bar | 10-12 lmh/bar | 7.6 lmh/bar |

The above examples demonstrate an effective membrane cleaning method with a pulsed flow generating device. With continuous supply of gas to the pulsed flow generating device, a random or chaotic flow pattern is created to effectively clean the membranes. Each cycle pattern of flow is different from the other in duration/frequency, intensity of high and low flows and the flow change profile. Within each cycle, the flow continuously varies from one value to the other in a chaotic fashion.

It will be appreciated that, although the embodiments described above use a pulsed gas/liquid flow, the invention is effective when using other randomly pulsed fluid flows including gas, gas bubbles and liquid.

It will be appreciated that further embodiments and exemplifications of the invention are possible without departing from the spirit or scope of the invention described.

What is claimed is:

1. A water treatment system comprising:
   a plurality of membrane modules arranged in a water treatment tank;
   a plurality of gas-lift pumps positioned below the plurality of membrane modules, each of the plurality of gas-lift pumps constructed and arranged to deliver a pulsed two-phase gas/liquid flow that is random in at least one of magnitude, frequency, and duration to each of the plurality of membrane modules.

2. The water treatment system of claim 1, wherein the pulsed two-phase gas/liquid flow to each of the plurality of membrane modules is delivered simultaneously.

3. The water treatment system of claim 1, further comprising a source of gas fluidly connected to the plurality of gas-lift pumps.

4. The water treatment system of claim 3, wherein each of the plurality of gas-lift pumps comprises:
   a chamber having a liquid feed inlet fluidly connected to the liquid feed and a gas inlet fluidly connected to the source of gas; and
   a tube positioned within the chamber and having at least one inlet fluidly connected to at least one of the source of gas and the liquid feed, and an outlet fluidly connected to each of the plurality of membrane modules.

5. A water treatment system comprising:
   a membrane module immersed in a liquid feed in a tank;
   a chamber positioned below the membrane module and having a first inlet fluidly connected to the liquid feed;
   a source of gas fluidly connected to a second inlet in the chamber; and
   a chamber outlet fluidly connected to the membrane module and constructed and arranged to allow for a two-phase gas/liquid flow that is random in at least one of magnitude, frequency, and duration.

6. The water treatment system of claim 5, wherein the chamber outlet comprises a tube fluidly connected to the source of gas.

7. The water treatment system of claim 6 further comprising a trough constructed and arranged to contain at least one of liquid feed and gas and at least partially surround the tube.

8. The water treatment system of claim 6, wherein the tube comprises an inlet fluidly connected to the source of gas.

9. The water treatment system of claim 5, further comprising a control device configured to deliver gas from the source of gas to the chamber based on a level of the liquid feed in the tank.

10. The water treatment system of claim 5, further comprising a fluid distributor connected between the chamber and the membrane module.

\* \* \* \* \*